US012744674B2

(12) United States Patent
Herder, III et al.

(10) Patent No.: US 12,744,674 B2
(45) **Date of Patent: *Sep. 22, 2026**

(54) PUBLIC/PRIVATE KEY BIOMETRIC AUTHENTICATION SYSTEM

(71) Applicant: Badge Inc, Lewes, DE (US)

(72) Inventors: Charles H. Herder, III, Newark, CA (US); Tina P. Srivastava, Newark, CA (US)

(73) Assignee: Badge Inc., Lewes, DE (US)

( * ) Notice: Subject to any disclaimer, the term of this patent is extended or adjusted under 35 U.S.C. 154(b) by 61 days.

This patent is subject to a terminal disclaimer.

(21) Appl. No.: 18/477,153

(22) Filed: Sep. 28, 2023

(65) Prior Publication Data

US 2024/0022420 A1 Jan. 18, 2024

Related U.S. Application Data

(63) Continuation of application No. 17/005,941, filed on Aug. 28, 2020, now Pat. No. 11,811,936, which is a (Continued)

(51) Int. Cl.
*H04L 9/32* (2006.01)
*G06F 21/32* (2013.01)
(Continued)

(52) U.S. Cl.
CPC ............ *H04L 9/3231* (2013.01); *G06F 21/32* (2013.01); *G06F 21/575* (2013.01); (Continued)

(58) Field of Classification Search
CPC ... H04L 9/3231; H04L 9/0618; H04L 9/0866; H04L 9/14; H04L 9/30; G06F 21/32; G06F 21/575; G06F 2221/034; G06F 2221/2117
See application file for complete search history.

(56) References Cited

U.S. PATENT DOCUMENTS

| | | | |
|---|---|---|---|
| 6,788,788 B1 | 9/2004 | Kasahara et al. | |
| 7,272,245 B1 | 9/2007 | Layton | |

(Continued)

FOREIGN PATENT DOCUMENTS

| | | |
|---|---|---|
| EP | 1 175 749 B1 | 7/2005 |
| JP | 2006-166433 A | 6/2006 |

(Continued)

OTHER PUBLICATIONS

Herder et al.:"Trapdoor Computational Fuzzy Extractors and Stateless Cryptographically-Secure Physical Unclonable Functions," IEEE Transactions on Dependable and Secure Computing, vol. PP, No. 99, 18 pages (Mar. 1, 2016).

(Continued)

*Primary Examiner* — Darshan I Dhruv
(74) *Attorney, Agent, or Firm* — Merchant & Gould P.C.

(57) ABSTRACT

A device, method, and computer readable storage medium generate a biometric public key for an individual based on both the individual's biometric data and a secret, in a manner that verifiably characterizes both while tending to prevent recovery of either by anyone other than the individual. The biometric public key may be later used to authenticate a subject purporting to be the individual, using a computing facility that need not rely on a hardware root of trust. Such biometric public keys may be distributed without compromising the individual's biometric data, and may be used to provide authentication in addition to, or in lieu of, passwords or cryptographic tokens. Various use cases are disclosed, including: enrollment, authentication, establishing and using a secure communications channel, and cryptographically signing a message.

26 Claims, 12 Drawing Sheets

Related U.S. Application Data continuation of application No. 15/349,781, filed on Nov. 11, 2016, now Pat. No. 10,764,054.

(60) Provisional application No. 62/255,186, filed on Nov. 13, 2015.

(51) Int. Cl.

| | |
|---|---|
| ***G06F 21/57*** | (2013.01) |
| ***H04L 9/06*** | (2006.01) |
| ***H04L 9/08*** | (2006.01) |
| ***H04L 9/14*** | (2006.01) |
| ***H04L 9/30*** | (2006.01) |

(52) U.S. Cl.

CPC .......... *H04L 9/0618* (2013.01); *H04L 9/0866* (2013.01); *H04L 9/14* (2013.01); *H04L 9/30* (2013.01); *H04L 9/3263* (2013.01); *G06F 2221/034* (2013.01); *G06F 2221/2117* (2013.01)

(56) References Cited

U.S. PATENT DOCUMENTS

| | | | | |
|---|---|---|---|---|
| 2001/0031075 | A1* | 10/2001 | Fujii | G06V 40/12 382/125 |
| 2006/0123239 | A1 | 6/2006 | Martinian et al. | |
| 2007/0118758 | A1 | 5/2007 | Takahashi et al. | |
| 2007/0140145 | A1 | 6/2007 | Kumar et al. | |
| 2007/0245154 | A1* | 10/2007 | Akkermans | G07C 9/37 713/186 |
| 2008/0025575 | A1 | 1/2008 | Schonberg et al. | |
| 2008/0072068 | A1* | 3/2008 | Wang | H04L 9/3242 713/191 |
| 2008/0235515 | A1* | 9/2008 | Yedidia | G06V 40/193 713/186 |
| 2009/0271634 | A1* | 10/2009 | Boult | H04L 9/0877 713/186 |
| 2010/0005315 | A1* | 1/2010 | Abdallah | H04L 9/30 713/182 |
| 2010/0086132 | A1 | 4/2010 | Tavernier et al. | |
| 2011/0126024 | A1 | 5/2011 | Beatson et al. | |
| 2011/0302420 | A1 | 12/2011 | Davida | |
| 2012/0087550 | A1 | 4/2012 | Akkermans et al. | |
| 2012/0121084 | A1 | 5/2012 | Tomlinson et al. | |
| 2012/0195475 | A1* | 8/2012 | Abiko | G06V 10/987 382/115 |
| 2013/0318361 | A1* | 11/2013 | Erickson | G06F 21/6254 713/193 |
| 2014/0105403 | A1* | 4/2014 | Baldi | H04L 9/304 380/282 |
| 2014/0139318 | A1 | 5/2014 | Malpani et al. | |
| 2014/0250109 | A1* | 9/2014 | Wang | G06F 16/583 707/723 |
| 2014/0281567 | A1* | 9/2014 | Rane | H04L 9/3231 713/186 |
| 2014/0325230 | A1* | 10/2014 | Sy | H04L 9/3231 713/171 |
| 2014/0372766 | A1 | 12/2014 | Ryan, Jr. | |
| 2015/0067336 | A1 | 3/2015 | Ding | |
| 2016/0034585 | A1 | 2/2016 | Rokhlenko et al. | |
| 2016/0125416 | A1* | 5/2016 | Spencer | G06Q 20/3829 705/71 |
| 2017/0085562 | A1 | 3/2017 | Schultz et al. | |
| 2017/0337364 | A1 | 11/2017 | Whaley et al. | |
| 2018/0114226 | A1 | 4/2018 | Desai et al. | |

FOREIGN PATENT DOCUMENTS

| | | | | |
|---|---|---|---|---|
| JP | 2007-148470 | A | 6/2007 | |
| JP | 2008-502071 | A | 1/2008 | |
| KR | 10-2018-0000849 | | 1/2018 | |
| KR | 101845192 | B1 | 4/2018 | |
| WO | WO-2005069534 | A1 * | 7/2005 | G06Q 20/341 |
| WO | 2005/122467 | A1 | 12/2005 | |
| WO | 2017/075063 | A1 | 5/2017 | |

OTHER PUBLICATIONS

Herder et al.: "A Stateless Cryptographically-Secure Physical Unclonable Function," IEEE Transactions on Dependable and Secure Computing, 17 pages, (2015).

Rivest et al.:"A Method for Obtaining Digital Signatures and Public-Key Cryptosystems," Communications of the ACM, vol. 21, No. 2, pp. 120-126, (Feb. 1978).

International Searching Authority: International Search Report—International Application No. PCT/US2016/061647, dated Feb. 21, 2017, together with the Written Opinion of the International Searching Authority, 14 pages.

Herder et al.: "Trapdoor Computational Fuzzy Extractors," International Association for Cryptologic Research, vol. 201411185:190315, Nov. 15, 2014, 14 pages.

Fuller et al.: "Computational Fuzzy Extractors," International Conference on Computer Analysis of Images and Patterns, Springer, Berlin, Heidelberg, Dec. 1, 2013, pp. 174-193.

Nandakumar et al.: "Fingerprint-Based Fuzzy Vault: Implementation and Performance," IEEE Transactions on Information Forensics and Security, IEEE, Piscataway, NJ, US, vol. 2, No. 4, Dec. 1, 2007, pp. 744-757.

European Patent Office: Extended European Search Report, Application No. 16865141.2, dated Jun. 21, 2019, 5 pages.

Internatioanal Searching Authority/KR: International Search Report and the Written Opinion of the International Searching Authority, Application No. PCT/US2019/032996, mailed Sep. 24, 2019, 13 pages.

Dodis et al.: Fuzzy Extractors: How to Generate Strong keys from Biometrics and Other Noisy Data, Apr. 17, 2004, Advances in Cryptology—Eurocrypt 2004, LNCS, Springer, pp. 523-540, 978-3-540-21935-4, XP019005038.

European Patent Office: Communication pursuant to Article 94(3) EPC, Application No. 16865141.2, dated Feb. 7, 2020, 6 pages.

International Searching Authority/EPO: International Search Report and Written Opinion of the International Searching Authority, Application No. PCT/2020/015607, mailed Apr. 17, 2020, 15 pages.

Rathgeb, C. et al.: Context-based biometric key generation for Iris, IET Computer Vision, vol. 5, No. 6, Nov. 25, 2011, pp. 389-397; XP006043083, ISSN: 1751-9632, DOOI: 10.1049/IET-CVI.2010.0176.

Rathgeb, C. et al.: Context-based Texture Analysis for Secure Revocable Iris-Biometric Key Generation, 3rd International Conference on Imaging for Crime Detection and Prevention (ICDP 2009), Dec. 3, 2009, pp. 964-973, XP055495906, DOI: 10.1049/ic.2009.0229.

Hollingsworth, K. et al.: The Best Bits in an Iris Code, IEEE Transactions on Pattern Analysis and Machine Intelligence, vol. 31, No. 6, Jun. 1, 2009, pp. 964-973, XP011506955, DOI: 10.1109/TPAMI.2008.185.

Lee, Y. et al.: VASIR: An Open-Source Research Platform for Advanced Iris Recognition Technologies, Journal of Research of the National Institute of Standards and Technology, vol. 118, Apr. 1, 2013, p. 218, XP055848058, DOI: 10.6028/jres.118.011.

European Patent Office: Communication pursuant to Article 94(3) EPC, Application No. 16865141.2, mailed Oct. 25, 2021, 17 pages.

* cited by examiner

PUBLIC/PRIVATE KEY BIOMETRIC AUTHENTICATION SYSTEM

CROSS-REFERENCE TO RELATED APPLICATION

This application is a continuation of U.S. application Ser. No. 17/005,941, filed Aug. 28, 2020, which claims the benefit of U.S. application Ser. No. 15/349,781, filed Nov. 11, 2016, which claims the benefit of U.S. Provisional Application No. 62/255,186, filed Nov. 13, 2015. Each of these applications is incorporated herein by reference in its entirety.

FIELD OF THE INVENTION

The present invention relates to security arrangements for protecting computers, components thereof, programs or data against unauthorized activity by providing authentication of user biometric data, and more particularly to using cryptographic means for verifying the identity or authority of the user using biometric data of the user without the need for non-transient storage of the biometric data.

DESCRIPTION OF RELATED ART

The prior art of biometric authentication systems generally falls into one of the following two categories. The first category provides authentication using a biometric database, where all biometrics are stored in a database locally or on a secure server. To authenticate a subject who purports to be a known individual, one collects biometric data from the subject and compares it with biometric data, stored in the secure database, that is associated with the individual. The subject is authenticated if his or her data matches the associated data in the database. Because biometric data capture processes produce slightly different data each time, the biometric data captured from the subject will not exactly match the biometric data originally captured from the individual, so a match must be performed using some closeness-of-fit measure.

The use of biometric databases suffers from at least three distinct drawbacks. The first drawback is that the database is a single point of failure: compromise of the secure server compromises all individuals' biometrics contained therein. This is a critical failure, because individuals cannot generate new biometrics (e.g., iris patterns in the eye, fingerprints, and other such physical characteristics). Remediation of this drawback requires considerable expense. To protect non-transient storage of biometrics locally requires expensive, tamper-proof memory, while to protect non-transient storage of biometrics on a publicly accessible database requires network firewalls and other considerable security measures. The second drawback is that authentication using remote biometric databases requires constant connectivity: a biometric scanner must communicate with the database server in order to validate user, and failure of the communications link could prevent authentication. This is a critical failure for time-sensitive authentication scenarios. (A locally stored database does not scale efficiently to the scenario where many users may be using multiple biometric scanners.) The third drawback is that a user has to provision authentication data with each device before using it. If a person owns several smartphones, for example, she must spend the time to set up biometric passwords on each device.

This first category of biometric authentication is analogous to "secret key" cryptosystems, in that they store the "secret key" i.e., the biometric template in some secure database, and the user presents his/her biometric template for authentication. Any compromise of the biometric secret results in a break in security. This is to be contrasted with the public key model of cryptography, wherein a user securely stores a private key, and publishes a public key that other parties may use to communicate securely. Adapting biometric authentication to such a public key model has been a longstanding goal, which brings us to the second category of biometric systems.

The second category of prior art biometric authentication systems uses a biometric "mask" with a code offset error correction. In this category, instead of storing the biometric data directly, one stores which bits from captured biometric data are stable (that is, unlikely to be noisy). Then, one uses error-correcting codes to correct for remaining noise. This approach also suffers from insecurity. It is known in the academic community that knowing which bits are stable could result in compromising the biometric itself, so storing which bits are stable can be as bad as storing the biometric itself. Moreover, if one attempts to store the stability mask in a secure database, then the same disadvantages of the biometric database reappear, namely the requirements to separately secure the database and to require constant availability. Finally, this approach is typically infeasible for real-world applications. For example, the best known error correcting codes cannot correct enough errors to extract keys reliably.

In summary, most commercially deployed biometric systems follow the first, "secret key" model. While there has been significant effort devoted to adapting biometrics to a public key model, current implementations of technologies are either insecure, impractical, or both.

SUMMARY OF ILLUSTRATED EMBODIMENTS

Various embodiments of the invention solve the above problems with biometric authentication by avoiding entirely the requirement to store either the original biometric data, or data that can be used to recover it. Instead, biometric data captured from an individual are used to encrypt a secret number, thereby forming a public key characterizing a biometric, or a "biometric public key". Advantageously, the encryption may be performed in a hardware security module (HSM), for example in an HSM that implements the United States Federal Information Processing Standards (FIPS), series 140, that defines requirements for such modules. The biometric data and the secret number are combined in such a way that biometric data later captured from a subject purporting to be the individual can be used to decrypt the secret number in a verifiable way, despite the fact that biometric data capture is not exactly repeatable.

These embodiments are particularly robust for several reasons. A biometric public key described herein may be distributed freely, as the key is self-validating. Thus, a subject may carry her own biometric public key in a physical token for authentication as an individual. For example, the physical token may be public and non-electronic, such as a QR code on a business card. In this way, the need is avoided for a central biometric database, especially one that must be constantly available yet safeguarded against compromise.

Another reason the disclosed embodiments are robust is that they may rely on the advantages of the biometric mask, without its attendant disadvantages. That is, a biometric public key may be created using the portions of the biometric data that are most repeatable between measurements and best distinguish between different individuals. When the extracted information is qualified in this manner, it provides a dramatically better basis for authentication, because the information extracted this way from one person's biometric will differ substantially and in a repeatable way from the information extracted from another person's biometric.

Yet another reason why the method of authentication is uniquely robust is that the information extracted from the biometric data is not accessible to the public. Instead, the extracted information is processed so as to produce a public key, and then the extracted information is discarded. Because neither the biometric data nor any intermediate processing results are stored, they cannot be stolen, and therefore the biometric data is much more secure than in prior art systems. The public key can be used in the myriad of ways in which public keys have been used in the prior art—however, a biometric public key has the benefit of being uniquely associated with an individual by virtue of the biometric.

Thus, a first embodiment of the invention is a device for using biometric data to authenticate a subject as an individual whose biometric data has been previously obtained using a first transducer, without the need for non-transient storage of the biometric data. The device includes a second transducer and a computing facility that is coupled to the second transducer. The computing facility has a computing processor and a non-transitory computer readable storage medium encoded with instructions that, when executed by the computing processor, establish certain processes for authentication.

A first such process is receiving by the computing facility, from the second transducer, a digital electronic signal that characterizes a biometric of the subject. A second such process is extracting by the computing facility, from the digital electronic signal, (a) a set of biometric values of the subject and (b), for each member of the set of biometric values of the subject, a confidence value indicating a degree of confidence that the corresponding biometric value is stable between characterizations. A third such process is using the confidence values to select, by the computing facility, a confident subset of the set of biometric values of the subject, the confident subset being a reliable discriminant of the identity of the subject based on the biometric. A fourth such process is receiving by the computing facility, from a storage facility, a biometric public key that was computed based on a secret number and the biometric data of the individual that has been previously obtained using the first transducer, wherein the biometric public key verifiably characterizes both the biometric data of the individual and the secret number without the need for non-transient storage of either the biometric data of the individual or the secret number. A fifth such process is calculating, by the computing facility, a candidate value for the secret number using the biometric public key and the confident subset. A sixth such process is transmitting, by the computing facility, an indication that the subject is authenticated as the individual when the candidate value for the secret number is deemed equivalent to the secret number characterized by the biometric public key.

Variations on this first embodiment are contemplated. In one variant, the storage facility is a public data source for storing the biometric public key, the device further comprising a hardware security module for authenticating the public data source to the device. Another variant further comprises a non-transitory data store, and the storage facility is the non-transitory data store. In another variant, the storage facility is a cryptographic token provided by the subject. In yet another variant, the device includes a hardware security module for ensuring the integrity of the second transducer. In still another variant, the device includes a mathematics coprocessor.

In a further variant, the established processes further include receiving by the computing facility, from the storage facility, a one-way function of the secret number, and transmitting, by the computing facility, includes applying the one-way function to the candidate value for the secret number and comparing the result to the received one-way function of the secret number. The one-way function may be a cryptographic hash function.

The biometric public key may include data comprising a bitwise exclusive OR of (a) a vector of biometric values of the individual, with (b) a matrix product of a binary matrix with a representation of the secret number as a vector of bits. In a variant, the binary matrix is non-square, and transmitting, by the computing facility, includes (a) calculating, by the computing facility, a set of candidate biometric values of the individual using the biometric public key, the binary matrix, and the putative secret number, and (b) determining that a Hamming distance between the set of candidate biometric values of the individual and the set of extracted biometric values of the subject is less than a given threshold distance. The binary matrix may be associated uniquely with the individual, or associated uniquely with the device, or permanently fixed as a design parameter wherein the same binary matrix can be used to authenticate multiple individuals. One variant includes a third transducer for inputting additional assurance data used to compute the biometric public key.

A second embodiment of the invention is a computer-implemented method of using biometric data to authenticate a subject as an individual whose biometric data has been previously obtained using a first transducer, without the need for non-transient storage of the biometric data. The method includes receiving by a computing facility, from a second transducer coupled to the computing facility, a digital electronic signal that characterizes a biometric of the subject. The method next includes extracting by the computing facility, from the digital electronic signal, (a) a set of biometric values of the subject and (b), for each member of the set of biometric values of the subject, a confidence value indicating a degree of confidence that the corresponding biometric value is stable between characterizations. The method then includes using the confidence values to select, by the computing facility, a confident subset of the set of biometric values of the subject, the confident subset being a reliable discriminant of the identity of the subject based on the biometric. The method continues with receiving by the computing facility, from a storage facility, a biometric public key that was computed based on a secret number and the biometric data of the individual that has been previously obtained using the first transducer, wherein the biometric public key verifiably characterizes both the biometric data of the individual and the secret number without the need for non-transient storage of either the biometric data of the individual or the secret number. The method then requires calculating, by the computing facility, a candidate value for the secret number using the biometric public key and the confident subset. The method concludes with authenticating the subject as the individual when the candidate value for the secret number is deemed equivalent to the secret number.

Variations on this second embodiment are contemplated. One variant includes receiving, by the computing facility from the storage facility, a one-way function of the secret number, wherein authenticating the subject as the individual includes applying the one-way function to the candidate value for the secret number and comparing the result to the received one-way function of the secret number. The one-way function may be a cryptographic hash function.

In another variant, the biometric public key includes data comprising a bitwise exclusive OR of (a) a vector of biometric values of the individual, with (b) a matrix product of a binary matrix with a representation of the secret number as a vector of bits. In this variant, the binary matrix may be non-square, and authenticating the subject as the individual includes (a) calculating, by the computing facility, a set of candidate biometric values of the individual using the biometric public key, the binary matrix, and the putative secret number, and (b) determining that a Hamming distance between the set of candidate biometric values of the individual and the set of extracted biometric values of the subject is less than a given threshold distance. The binary matrix may be associated uniquely with the individual, or associated uniquely with the computing facility, or permanently fixed as a design parameter wherein the same binary matrix can be used to authenticate multiple individuals. One variant further includes using, by the computing facility, biometric data pertaining to a different measurable characteristic to authenticate a second subject as a second individual whose biometric data has been previously obtained.

In some variants, the method further includes performing additional actions after a successful authentication of the subject as the individual. Thus, one variant further includes decrypting, by the computing facility using the candidate value for the secret number, encrypted cipher text received by a computing device in which the computing facility is disposed. Another variant includes digitally signing a message, by the computing facility using the candidate value for the secret number. Yet another variant further includes receiving encrypted firmware for booting a computing device in which the computing facility is disposed, by the computing facility, from a memory of the computing device; decrypting, by the computing facility using the candidate value for the secret number, the encrypted firmware to produce decrypted firmware; and providing the decrypted firmware by the computing facility to a computing processor of the computing device. Still another variant further includes executing a cryptographic algorithm that operates on the secret number, by the computing facility, responsive to a request message from an application executing on a computing processor of a computing device in which the computing facility is disposed.

A third embodiment of the invention is a non-transitory computer readable storage medium encoded with instructions that, when executed by a computing facility, establish the above method and its variants.

A fourth embodiment of the invention is a device for generating a biometric public key for an individual based on biometric data of the individual, without the need for non-transient storage of the biometric data. The device includes a transducer and a computing facility, coupled to the transducer, the computing facility including a computing processor and a non-transitory computer readable storage medium encoded with instructions that, when executed by the computing processor, establish certain process for generating the biometric public key.

A first such process is receiving by the computing facility, from the transducer, a digital electronic signal that characterizes a biometric of the individual. A second such process is extracting by the computing facility, from the digital electronic signal, (a) a set of biometric values of the individual and (b), for each member of the set of biometric values of the individual, a confidence value indicating a degree of confidence that the corresponding biometric value is stable between characterizations. A third such process is using the confidence values to select, by the computing facility, a confident subset of the set of biometric values of the individual, the confident subset being a reliable discriminant of the identity of the subject based on the biometric. A fourth such process is generating by the computing facility a secret number. A fifth such process is calculating by the computing facility the biometric public key based on the secret number and the confident subset, wherein the biometric public key verifiably characterizes both the biometric data of the individual and the secret number without the need for non-transient storage of either the biometric data of the individual or the secret number. A sixth such process is storing the biometric public key in a storage facility.

Variations on this fourth embodiment are contemplated. In one variant, the storage facility is a public data source for storing the biometric public key, the device further comprising a hardware security module for authenticating the public data source to the device. Another variant further comprises a non-transitory data store, and the storage facility is the non-transitory data store. In another variant, the storage facility is a cryptographic token that may be provided by the individual. Yet another variant includes a hardware security module for ensuring the integrity of the transducer. Another variant has a mathematics coprocessor.

In another variant, the established processes further comprise: associating, by the computing facility, the biometric public key with a one-way function of the secret number; and storing the one-way function of the secret number in the storage facility. The one-way function may be a cryptographic hash function.

The biometric public key may include data comprising a bitwise exclusive OR of (a) a vector of biometric values of the individual, with (b) a matrix product of a binary matrix with a representation of the secret number as a vector of bits. Moreover, the binary matrix may be associated uniquely with the individual, associated uniquely with the device, or permanently fixed as a design parameter wherein the same binary matrix can be used to authenticate multiple individuals.

A fifth embodiment of the invention is a computer-implemented method of generating a biometric public key for an individual based on biometric data of the individual, without the need for non-transient storage of the biometric data. The method includes receiving by a computing facility, from a transducer, a digital electronic signal that characterizes a biometric of the individual. The method also includes extracting by the computing facility, from the digital electronic signal, (a) a set of biometric values of the individual and (b), for each member of the set of biometric values of the individual, a confidence value indicating a degree of confidence that the corresponding biometric value is stable between characterizations. The method then includes using the confidence values to select, by the computing facility, a confident subset of the set of biometric values of the individual, the confident subset being a reliable discriminant of the identity of the subject based on the biometric. The method further includes generating by the computing facility a secret number. The method proceeds with calculating by the computing facility the biometric public key based on the secret number and the confident subset, wherein the biometric public key verifiably characterizes both the biometric data of the individual and the secret number without the need for non-transient storage of either the biometric data of the individual or the secret number. The method also requires storing the biometric public key in a storage facility.

Variations on this fifth embodiment are contemplated. One variant continues by associating, by the computing facility, the biometric public key with a one-way function of the secret number; and storing the one-way function of the secret number in the storage facility. The one-way function may be a cryptographic hash function. Alternately or in addition, the biometric public key includes data comprising a bitwise exclusive OR of (a) a vector of biometric values of the individual, with (b) a matrix product of a binary matrix with a representation of the secret number as a vector of bits. If so, the binary matrix may be associated uniquely with the individual, associated uniquely with the computing facility, or permanently fixed as a design parameter wherein the same binary matrix can be used to authenticate multiple individuals.

A sixth embodiment of the invention is a digital storage medium in which is non-transitorily stored the biometric public key that was generated according to the above method or its variants.

A seventh embodiment of the invention is a non-transitory computer readable storage medium encoded with instructions that, when executed by a computing facility, establish processes for generating a biometric public key for an individual based on biometric data of the individual, without the need for non-transient storage of the biometric data, according to the above method and its variants.

A person having ordinary skill in the relevant art may appreciate that the invention may be embodied in other ways.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

Figure 1:
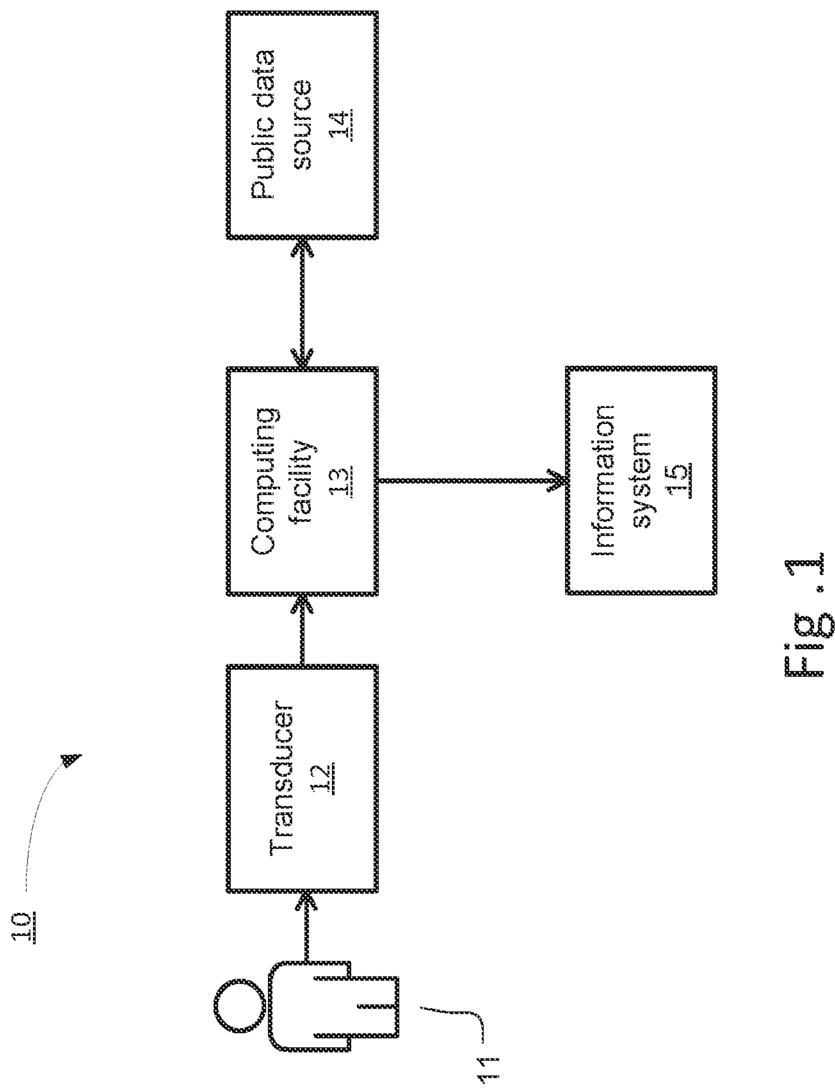
FIG. 1 is a schematic representation of an environment in which an embodiment of the invention may be used.

Definitions. As used in this description and the accompanying claims, the following terms shall have the meanings indicated, unless the context otherwise requires:

An "individual" is an animate or inanimate object having a unique identity, and may be a human or other organism.

A "subject" is an animate or inanimate object purporting to have the unique identity of a specific individual.

A "biometric" is a measurable characteristic of a distinct individual or of a distinct group of individuals, or a combination of such characteristics, that may be used to determine the unique identity of the individual or group. Some non-limiting examples of such measurable organic characteristics are: an iris pattern, a retinal blood vessel pattern, a fingerprint, a genetic pattern or DNA fingerprint, a voice print, a speed or cadence of typing, a pattern of blood flow, a brain structure or electrical pattern, a behavioral signal (such as hand movements), expertise-based continuous biometrics, and a gait of the individual. An example of a measurable inorganic characteristic, when the individual is a distinct silicon wafer having transistors, is a random variation in the transistor gate delays caused by the process of manufacturing the distinct silicon wafer; such a "silicon biometric" is detectable using a ring oscillator, as is known in the art.

A "biometric value" is a categorization of a portion of a measurement of a biometric according to a property of the measurement. For example, if the biometric is an iris print, and measurement consists of imaging an iris as an array of pixels, then the relevant portion of the measurement is a single pixel in the image, and the relevant property may be a brightness or color of the pixel to be categorized. Measurement of the entire biometric may include many biometric values.

A "confidence value for a biometric value", or simply "confidence value", is a number indicating a degree of relative confidence that the corresponding biometric value was correctly categorized.

A "confident subset" of biometric data is a collection of biometric values, selected according to their respective confidence values, that is (a) large enough to uniquely identify an individual within a given universe of identifiable individuals, and (b) small enough to be repeatably obtainable across measurements of the corresponding biometric under different conditions.

A "transducer" is any device having, as an output, an electronic signal that encodes a characterization of a biometric as a set of measured biometric values. If the output of such a device is not directly digital, then the term "transducer" includes any device additionally used to transform the output into digital form.

A "computing facility" means an electronic system having components that include a computing processor and a memory storing instructions that can be executed by the computing processor. A computing facility may be found, for example, in a desktop computer, a smartphone, a tablet computer, and similar electronic devices. A computing facility also may be found in embedded computing systems that perform specialized computations, for example point-of-sale machines, automated teller machines (ATMs), physical access barriers, video display kiosks, and similar electronic devices.

A "public key characterizing a biometric" (sometimes hereinafter a "biometric public key") is a number that (a) is calculated, based on a secret number and a set of biometric values of an individual, in a manner tending to prevent recovery of either the secret number or the set of biometric values by a subject other than the individual, and (b) verifiably characterizes both the biometric data of the individual and the secret number, without the need for non-transient storage of either the biometric data of the individual or the secret number. A biometric public key has nothing to do per se with public key/private key systems known in the art (of which some systems are sometimes called "PKI", for "public key infrastructure"), such as the RSA system. (See Rivest, Ronald L., Adi Shamir, and Len Adleman. "A method for obtaining digital signatures and public-key cryptosystems". *Communications of the ACM* 21.2 (1978): 120-126.)

A "storage facility" is a local or remote system for non-transitory storage of digital data. A storage facility optionally includes a server system to serve the data responsive to a request message from a processor, or the system can be accessed directly by the processor.

Concepts relevant to the present invention have been disclosed in the article by C. Herder, L. Ren, M. van Dijk, M. D. M. Yu, and S. Devadas, "Trapdoor computational fuzzy extractors and stateless cryptographically-secure physical unclonable functions," IEEE Transactions on Dependable and Secure Computing, vol. PP, no. 99, published Mar. 1, 2016 (available online at http://ieeexplore.ieee.org/document/7422776/), the contents of which are incorporated by reference in their entirety.

FIG. 1 is a schematic representation of an environment 10 in which an embodiment of the invention may be used. The environment 10 includes a subject 11 who desires access to an information system 15, such as a computer, smartphone, or other such electronic device. However, in accordance with standard data security practices, the information system 15 is protected by a security mechanism that permits access only once the subject has been authenticated as an individual authorized to use the information system 15. Alternatively, the subject 11 is not necessarily desiring access, but the embodiment is being used for surveillance, search, or track applications. Other possible uses are discussed below; it should be appreciated that various embodiments of the invention may be used to perform authentication of subjects as individuals generally, and the choice of embodiments discussed herein is made for concreteness, not to limit the scope of the invention.

Figure 2:
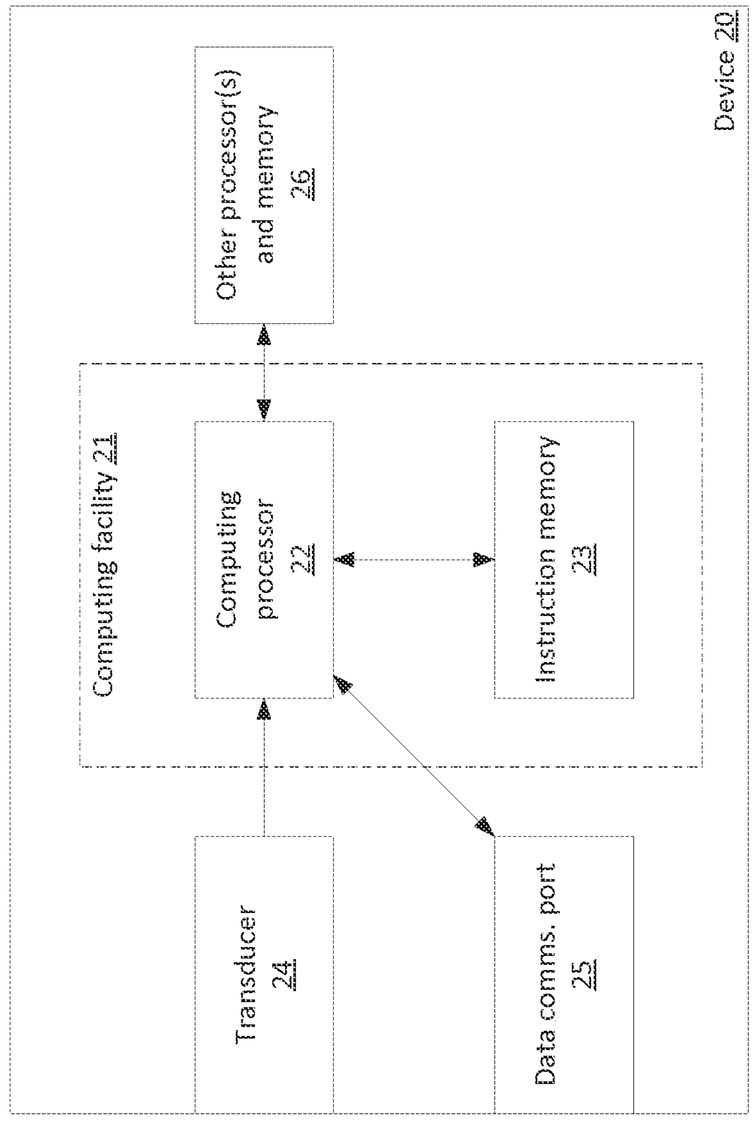
FIG. 2 is a schematic representation of a device for generating or using a biometric public key in accordance with an embodiment of the invention.

To facilitate the authentication process, the subject 11 is presented to a transducer 12, which obtains a biometric. The transducer 12 may be, for example, an iris scanner or a fingerprint reader. The transducer 12 converts raw biometric data, such as an image, into a digital electronic signal that characterizes the biometric of the subject. The digital electronic signal is communicated to a computing facility 13 that performs the computations required to authenticate the subject 11. To perform this task, the computing facility 13 obtains a biometric public key from a storage facility 14. The computing facility 13 may be implemented using hardware, and firmware or software known in the art. In some embodiments of the invention, the transducer 12 and computing facility 13 are embodied in a single device, such as a smartphone. Details of one such embodiment are shown in FIG. 2. The storage facility 14 may be any source of data, including a key store such as a cryptographic token, cloud data storage, website, a server, or any other such storage device.

As discussed in more detail below, the computing facility 13 combines the characterization of the biometric present in the digital electronic signal with the biometric public key to compute a secret. For example, the secret may be a password, or other such information; in general, the secret may be any digital data. However, since computation of the secret may involve various mathematical or cryptographic operations, the secret is referred to in what follows as a "secret number" on which those operations may be performed, with the understanding that its conversion to ASCII or Unicode characters (or some other format) does not change its information content.

In one embodiment, the biometric public key contains sufficient information for the computing facility 13 to determine that the secret number was correctly computed. For example, the secret number may be encrypted using a one-way function, such as a cryptographic hash, and the hashed value is communicated with the biometric public key. To authenticate the subject 11, the one-way function is applied to the computed (candidate) secret number to determine whether there is a match. Once the determination has been made, the computing facility 13 transmits to the information system 15 an indication that the subject 11 is authenticated as a known individual.

In another embodiment, the computing facility 13 transmits the secret to the information system 15, which determines whether the subject 11 is authenticated as the known individual. For example, the information system 15 could determine, using processes known in the art, whether the secret corresponds to a password already associated with the known individual, and grant or deny access accordingly.

FIG. 2 is a schematic representation of a device 20 for generating or using a biometric public key in accordance with an embodiment of the invention. During an authentication process, the device 20, and more particularly the computing facility 21, is configured so that a subject is authenticated as a known individual only after the several processes shown in FIGS. 4 and 6 have been successfully completed.

The device 20 includes a computing facility 21, which has a computing processor 22 and an instruction memory 23. The computing facility 21 may be, for example, a hardware security module as known in the art. The computing processor 22 may be any conventional microprocessor, application-specific integrated circuit (ASIC), field-programmable gate array (FPGA), or other similar device. The instruction memory 23 is operable to store instructions that can be executed by the computing processor 22, and can be a conventional volatile random access memory (RAM) or similar as known in the art, a non-volatile memory such as a read only memory (ROM) or similar as known in the art, or a combination of such technologies.

The device 20 also includes a transducer 24, coupled to the computing facility 21, that is operable to output a digital electronic signal that characterizes a biometric. The transducer 24 may be, for example, an iris scanner or fingerprint imager, or other technology known in the art for obtaining biometric data.

The device 20 further includes an optional data communications port 25, coupled to the computing facility 21. The data communications port 25 may be used during an enrollment process to transmit a biometric public key, computed by the computing facility 21, to another device such as a cryptographic token, or to a public data source such as a public key database as described below in connection with FIGS. 3-6. Also, the data communications port 25 may be used during an authentication process to receive a biometric public key from such a cryptographic token or public data source. Therefore, the physical configuration of the data communications port 25 may vary depending on application, but may in any event be a wired data networking port (such as an Ethernet port) or a wireless data networking port (such as a Bluetooth or other near-field communication transceiver).

Finally, the device 20 may include one or more other processors and memory 26. The computing facility 21 may be designed to be incorporated into the electronic circuitry of many devices, including desktop computers, smartphones, tablet computers, and similar electronic devices, that perform functions unrelated to authentication. The other processors and memory 26 are shown to demonstrate how a computing facility 21 may be incorporated into such devices.

In some embodiments of the invention, the data communications port 25 is configurable to be coupled to a public data source that contains the biometric public key. Such embodiments may also include a hardware security module for authenticating the public data source to the device according to known methods. Alternately, the data communications port may physically receive a cryptographic token for storing the biometric public key. Note that this alternate embodiment does not require a reliable or consistent connection between the embodiment and any public data source, because the cryptographic token may be authenticated using known methods.

In some alternate embodiments of the invention, the device includes a hardware security module for ensuring the integrity of the second transducer. Such hardware security modules are known in the art. Alternately, the device may include a mathematics coprocessor for accelerating computation of mathematical operations relating to the equation. Such processors are also known in the art.

Figure 3:
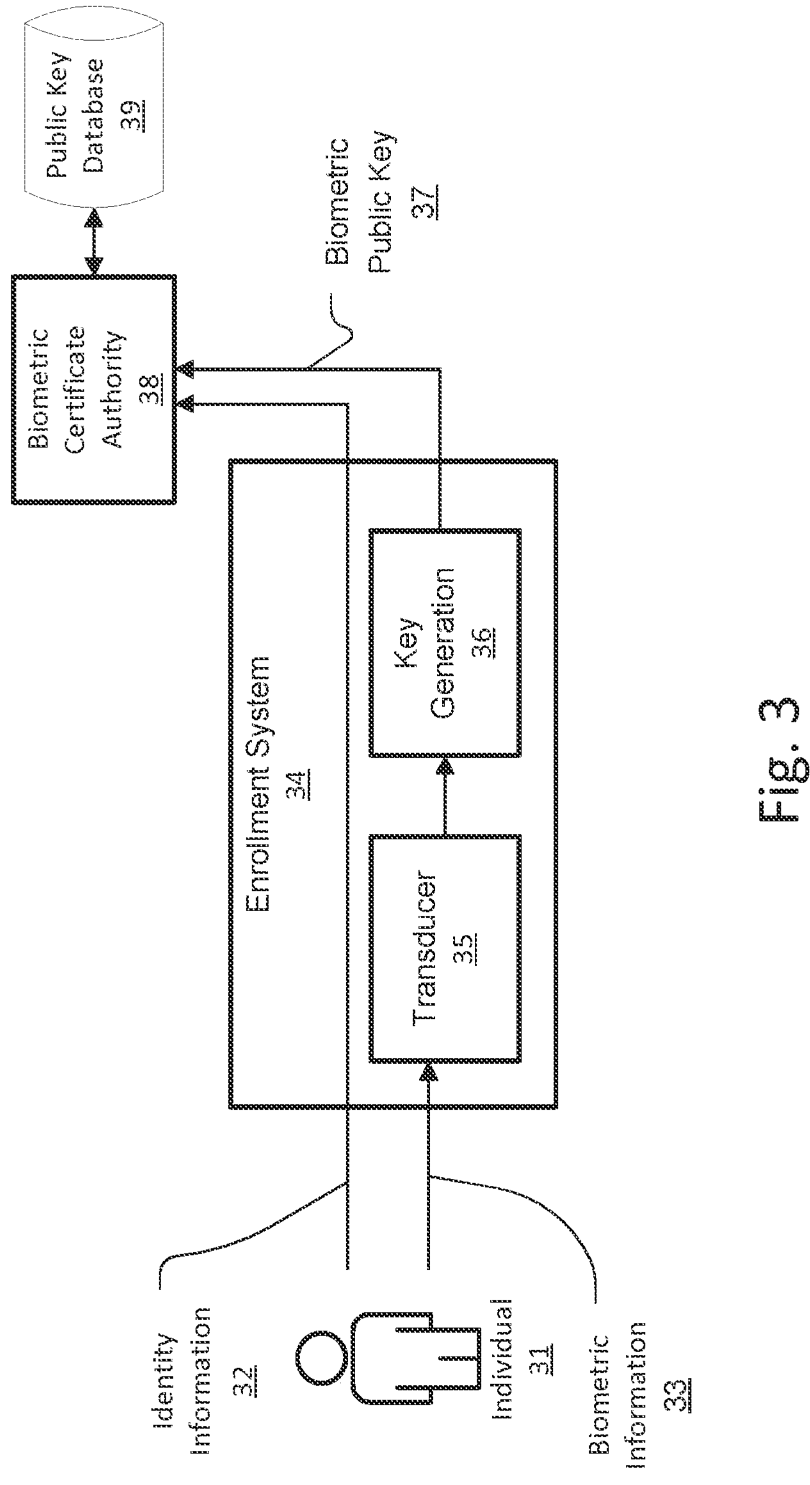
FIG. 3 is a schematic representation of data flow through functional components used in an embodiment of the invention during an enrollment process.

FIG. 3 is a schematic representation of data flow through functional components used in an embodiment of the invention during an enrollment process. The enrollment process creates a biometric public key for later use to authenticate the individual, as described below in connection with FIG. 4. The enrollment process begins with individual 31. This individual 31 is associated with certain identity information 32, for example a name, address, telephone number, driver license number, or other information that uniquely identifies the individual 31. The individual 31 also possesses measurable biometric information 33, for example a fingerprint or an iris pattern.

The individual 31 presents his or her identity information 32 and biometric information 33 to an enrollment system 34, which may be a device as shown in FIG. 2. In particular, the enrollment system 34 includes a transducer 35 as described above. The transducer 35 measures the biometric information 33 of the individual 31 using techniques known in the art that are particular to the type of biometric. For example, if the biometric is an iris print, then the transducer 35 may take an image of an eye of the individual 31. The transducer 35 then generates a digital electronic signal that characterizes the measured biometric of the individual, and forwards it to a computing facility within the enrollment system 34.

In the enrollment process of FIG. 3, the computing facility performs the indicated function of key generation 36. The key generation process 36 generates a biometric public key 37, as described below in connection with FIG. 5. To aid in later authentication, the enrollment system 34 may transmit the identity information 32 and the biometric public key 37 to a biometric certificate authority 38. The biometric certificate authority 38 may be, for example, a "certificate authority" as that phrase is known in the art of public key infrastructure, or it may be another facility that performs a similar function. The biometric certificate authority 38, upon receiving the identity information 32 and the biometric public key 37, stores these data in a public key database 39, which may be a conventional database.

Additional processes may be added to those depicted in FIG. 3 prior to enrollment. For example, the biometric certificate authority 38 may wish to authenticate the enrollment system 34 prior to accepting a new public key 37 or identity information 32. This may be done through standard encryption and authentication algorithms.

Advantageously, an existing database that (insecurely) stores identity information 32 in conjunction with biometric information 33 may be easily converted to a public key database 39 in accordance with an embodiment of the invention. The conversion process simply entails feeding the identity information 32 and biometric information 33 of each individual directly into the key generation 36 function of the enrollment system 34, bypassing the transducer 35. The resulting biometric public keys 37 may then be stored in association with the identity information 32, and the biometric information 33 may then be deleted (and therefore protected against compromise). Then, the biometric certificate authority 38 will not need to further protect the public key database 39 from malicious access, as no biometric information 33 will be stored therein. Moreover, individuals who had already enrolled will not need to re-enroll.

Moreover, such a conversion would not negatively impact biometric searching, such as might be used for criminal justice purposes. Current systems, including those in use by the Federal Bureau of Investigation, store large quantities of searchable biometric data. Understandably, these data are prime targets for identity thieves and other malicious individuals who would abuse them for profit. However, the above processes may be applied to encode biometric data as a public key that is itself unusable as a biometric, without storing the biometric data in an otherwise usable form. Because the contemplated processes for creating biometric public keys are linear, as described below in connection with FIG. 5, they permit rapid searching to find a match to a biometric query, without the need to decode the stored data. Thus, the vulnerable biometric database can be entirely eliminated.

Figure 4:
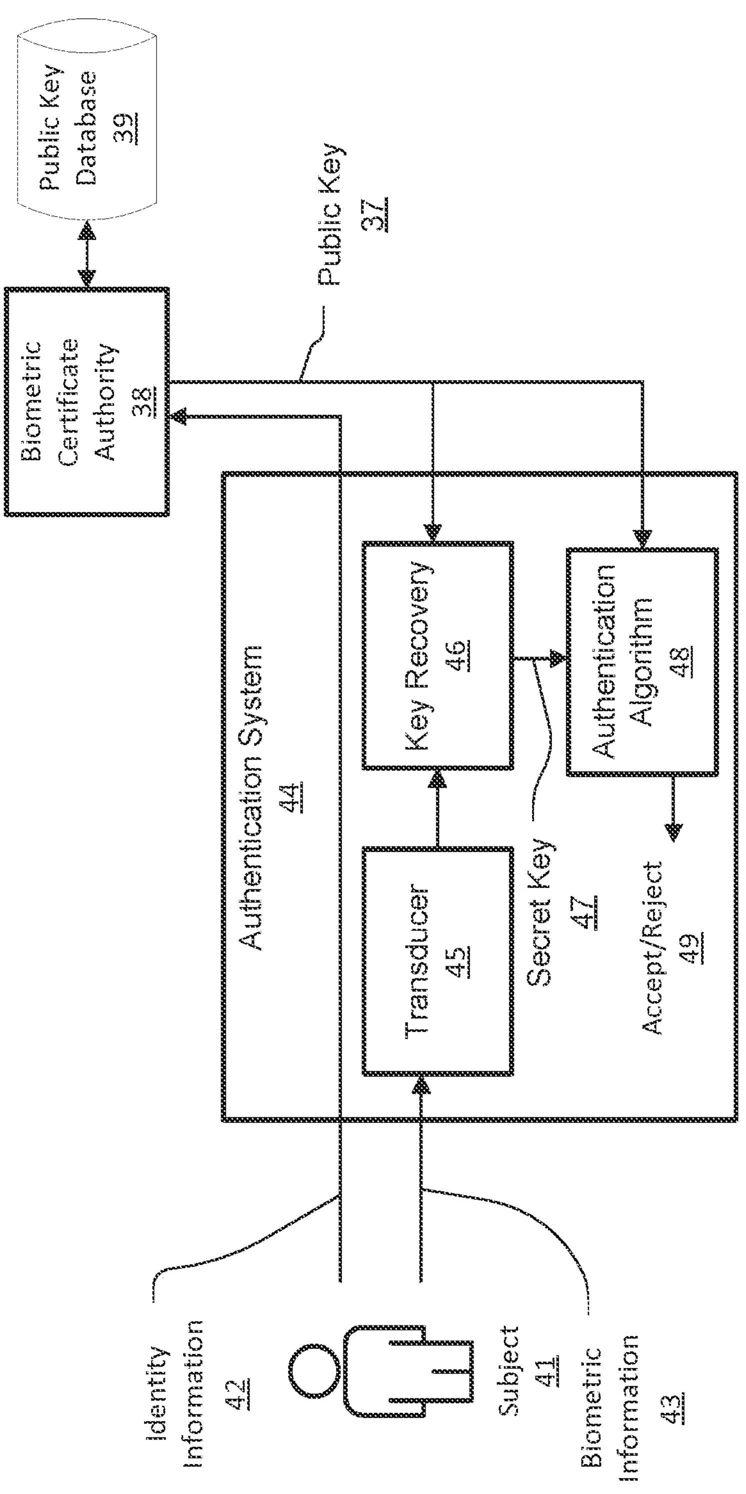
FIG. 4 is a schematic representation of data flow through functional components used in an embodiment of the invention during an authentication process.

FIG. 4 is a schematic representation of data flow through functional components used in an embodiment of the invention during an authentication process. Prior to authentication, an authorized individual would perform an enrollment process, such as that depicted in FIG. 3.

The authentication process begins with a subject 41 who is purporting to be the individual 31. Of course, the purpose of the authentication process is to confirm whether or not such a claim of identity is true. Thus, the subject 41 presents his or her identity information 42 and biometric information 43 to an authentication system 44, which may be a device as shown in FIG. 2. In particular, the authentication system 44 includes a transducer as described above. The transducer 45 measures the biometric information 43 of the subject 41 using techniques known in the art that are particular to the type of biometric and forwards a characterization of the biometric to a computing facility, as described above.

The authentication system 44 forwards the identity information 42 to the biometric certificate authority 38 that holds the biometric public key 37 for the purported individual 31. The biometric certificate authority 38 then retrieves the biometric public key 37 from the public key database 39 using the purported identity information 42 (e.g., via a database query), and returns it to the authentication system 44 as indicated. The authentication system 44 may request the biometric public key 37 at any time, but as there may be a delay in obtaining the biometric public key 37 across a data communications network such as the Internet, the authentication system 44 may request the identity information 42 prior to activating the transducer 45. To alleviate this delay, in some embodiments the authentication system 44 includes a port to physically receive a cryptographic token or a dongle on which the biometric public key 37 is stored. In some alternate embodiments, the public key database 39 is stored locally to the authentication system 44 (e.g., accessible via a private network). In these embodiments, it may be efficient or more user-friendly to compare the biometric information 43 against every biometric public key 37 in the public key database 39. In this way, the subject 41 need not provide any identity information 42 at all.

Upon receipt of both the biometric information 43 of the subject 41, and the biometric public key 37 of the individual, the computing facility then performs the function of key recovery 46. The process of key recovery 46 entails computing a candidate value for the secret key 47 used to generate the biometric public key 37. This process is described in more detail below in connection with FIG. 6. The computing facility then provides the biometric public key 37 and the candidate value for the secret key 47 to an authentication algorithm 48. This authentication algorithm 48 determines whether the biometric public key 37 and the candidate value for the secret key 47 together authenticate the subject 41 as the individual 31, and provides as output an external indication 49 of the determination.

Figure 5:
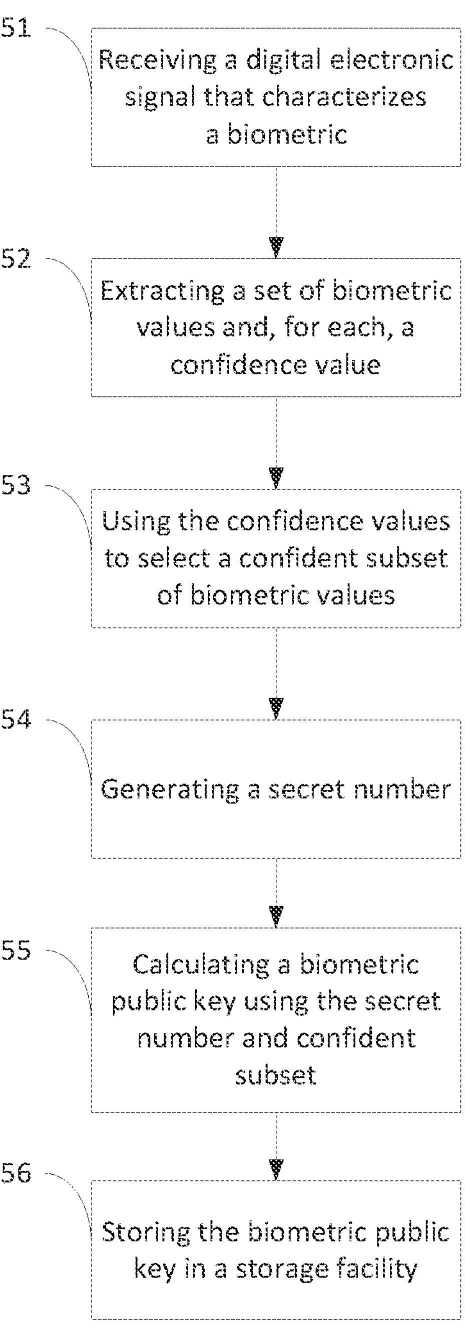
FIG. 5 is a flowchart illustrating a method of generating a biometric public key for an individual based on biometric data of the individual, without the need for non-transient storage of the biometric data, in accordance with the enrollment process of FIG. 3.

FIG. 5 is a flowchart illustrating a method of generating a biometric public key for an individual based on biometric data of the individual, without the need for non-transient storage of the biometric data. For concreteness, the biometric is described as an iris print; a person having ordinary skill in the art should be able to appreciate how the subsequent processes differ for other biometrics.

The processes of FIG. 5 are contemplated to be carried out by a computing facility in an enrollment system, such as the enrollment system 34 shown in FIG. 3. In a preferred embodiment, the computing facility is located in a secure environment, where the individual's identity could be separately authenticated. Thus, for example, the computing facility may be at a police station, or in a security office of a company, where a trusted person can verify the identity of the individual.

In a first process 51, the computing facility receives, from a transducer, a digital electronic signal that characterizes a biometric of the individual 31, as described above. Transduction may be performed according to any method known in the art. For an iris print, the transducer takes a photograph or video image of an iris, and outputs a signal encoding the image as (e.g. pixel) data according to a standard data format (e.g. RGB or grayscale).

In a second process 52, the computing facility extracts a set of biometric values from the signal. A biometric value may be any digital data, but is typically a single bit representing a "most important" feature of the corresponding binary-encoded number, where importance depends on the particular application. For example, if the signal includes pixel data, then a biometric value may depend on brightness intensity or a mixture of color values. The biometric value may be determined by whether a value of the feature (e.g., the brightness) falls above or below a pre-determined threshold, or other effective technique known in the art.

Also in the second process 52, the computing facility extracts, for each such biometric value, a confidence value indicating a degree of confidence that the corresponding biometric value is stable between characterizations. A confidence value may also be any digital data, but is typically a number of bits representing how far the biometric value is from the pre-determined threshold. That is, if the original measurement is close to the threshold, then categorization of the corresponding measurement as a biometric value is less certain, while if the original measurement is farther away from the threshold, then categorization is more confident. Thus, for example, certain pixels in an iris image may not be read consistently across several readings, while others will. This information will change with each iris, but is generally consistent for each iris.

In a third process 53, the confidence values are used to select a confident subset of biometric values that are stable between characterizations. The confident subset should be a reliable discriminant of the identity of the subject based on the biometric, and may be done, for example, by selecting a subset of the extracted biometric values whose corresponding confidence values are above a certain threshold. This process 53 therefore selects biometric values that are less likely to be noisy, and more likely to be stable. Thus, although each individual iris capture may have significant variation, each will very likely contain a subset of pixels that are reliable, and can be used in subsequent processing. The processes 52 and 53 optionally may be repeated during enrollment until the confident subset of such pixels stabilizes. While any number of bits may be used as a confident subset, in one embodiment the number of bits in the confident subset is limited to fewer than 540 bits.

Processes 52 and 53 together produce a confident subset of the raw biological values that can be used to reliably discriminate between individuals. Ideally, the confident subset permits identification of individuals with an extremely low false acceptance rate (where a subject is authenticated as an individual that they are not), and with a relatively low false rejection rate (where a subject is not authenticated as an individual that they are). A detailed explanation of these processes is given below with respect to an embodiment that uses an iris print as the biometric. It will be understood that the processes as they apply to other biometrics must be altered accordingly. In particular, whether or not certain processes are performed or what threshold or parameters are used depends on the false accept rate and false reject rate, and these rates are varied because they depend on the application. It should also be understood that these processes may also be performed during the authentication method described below in connection with FIG. 6.

In the example embodiment, during process 52, an individual scans his eyes using an infrared iris scanner to generate an iris image. The iris image may be in a RAW format. Several processes are used to determine whether or not this iris image can lead to obtaining data that would enable reliably discriminating the identity of the subject. If not, an additional iris scan may be requested, for example.

For example, if the iris image is not in focus, then it is unlikely that data could be obtained from it that would enable reliably discriminating the identity of the subject. Thus, a two dimensional Fourier transform may be used to determine whether the iris image is in focus.

A segmentation process may be used to identify and outline the pupil and iris in the image. If the pupil or iris are not found, it may indicate that the subject closed his eyes during the scan. The outline of the iris may be used to determine if portions of the iris are occluded, for example because the subject did not open his eyes wide enough during the scan. The iris image may be used to facilitate a low false rejection rate and ease-of-use. The subject may be asked to re-scan his eye to maintain a higher level of security and lower false accept rate.

Next, the iris, as outlined in the segmentation process, may be stretched from a donut-like shape to a rectangle, such as by using a polar to Cartesian transform. A normalization process may be performed to ensure the grey levels are in an appropriate region. The resulting biometric data are a matrix of 8 bit values that correspond to the grey scale. A Gabor transform may then be performed, resulting in a matrix of signed (positive and negative) 8 to 16 bit values. The matrix values that are positive are converted to ones and values that are negative are converted to zeros. The resulting matrix of zeros and ones is a two dimensional array of several thousand bits, called an "iris code".

This iris code is considered over sampled because it has regions or clusters of zeros and of ones. To improve security, specifically the measured entropy per bit, the iris code may be sub-sampled, such as by using a method that extracts only pixels that are 10 pixels apart. This sub-sampled array contains several hundred bits.

The next step is selecting the confident subset in process 53, the confident subset being a reliable discriminant of the identity of the subject based on the biometric. To do so, processes are performed to eliminate pixels that are not reliable because they are being obscured, such as by an eyelid, eyelash, glare, reflection, dust, dirt, or part of eyewear like the rim of a pair of glasses. One method of identifying reliable bits includes identifying bits in the center of clusters and far away from edges, since the edges are influenced by noise. The probability of error is inversely proportional to the distance to an edge. The probably of a bit erroneously flipping from zero to one or vice versa is higher at edges, so a confident subset would include samples in the middle of clusters. Thus, in the embodiment, each pixel is mapped to a number that represents the distance to the nearest edge or Euclidean distance. Smaller numbers indicate smaller distances or lower reliability.

In one embodiment, the number of bits in the confident subset may be defined as a security parameter plus some fraction. For example, for a security parameter of 80 bits, 100 bits will be selected in the confident subset. In another embodiment, the number of bits in the confident subset is based on a percentage. For example, the most reliable 20% of bits will be selected, resulting in a confident subset, such as one comprising 94 bits. Thus, the number of bits needed to distinguish two individuals is determined and that many bits with associated reliability are chosen as the confident subset, if possible.

One method of identifying reliable bits includes using the magnitude of the values in the matrix of signed values resulting from the Gabor transform. Values with very large magnitudes may indicate glare or reflection because the Gabor transform does not distinguish high contrast from errors like glare or reflection. Values with very low magnitudes are also likely to be unreliable because an erroneous bit flip is more likely. Therefore, the confident subset could include values with a medium magnitude, such as the middle 60% of values.

In a fourth process 54, the computing facility generates a secret number. There are many methods for generating a secret number, including the use of a pseudo-random number generator. Alternately, the secret number may be provided by the individual, in the form of a pass phrase that is subsequently processed using a cryptographic (e.g. hash) function to form a pseudo-random number.

In a fifth process 55, the computing facility calculates a biometric public key based on the secret number and the confident subset of biometric values. The process 55 corresponds to the function of key generation 36 in FIG. 3. One method of computing such a biometric public key uses linear algebra, although a person of ordinary skill in the art may appreciate other methods that may be used.

The linear algebra method may be more easily understood if some notation is first set. Represent the biometric public key as a vector of bits called K, the secret number as a vector of bits called S, and the confident subset of biometric data as a vector of bits called B. The biometric public key K has the same size as the confident biometric data B (i.e., each can be expressed using N rows and 1 column of bits), while the secret number S may have any size (i.e., it can be expressed using M rows and 1 column of bits). Choose a binary matrix A that has N rows and M columns of bits. Then a formula for the biometric public key K may be expressed as $K=A\cdot S+B$. That is, the biometric public key K is obtained by multiplying the binary matrix A by the secret number S (i.e., using matrix multiplication), then adding the confident biometric data B (i.e. using a bitwise exclusive OR). The binary matrix A will not be square if $M\neq N$.

The binary matrix A may be chosen using any technique, or may be chosen at random. One embodiment may choose the binary matrix A for each biometric public key K, so that it is uniquely associated with the individual. In this embodiment, the binary matrix A must be distributed with each biometric public key K, and in essence forms part of the public key. Another embodiment may associate the binary matrix A with the computing facility itself, to identify keys generated using that facility. In this embodiment, the binary matrix A is not uniquely associated with each biometric public key K, but must be obtained from a biometric certificate authority or other source prior to authentication. Still another embodiment may designate the binary matrix A as a constant design parameter, so that multiple computing facilities may be used to generate cross-compatible biometric public keys. In this embodiment, the binary matrix A need not even be made public, and may be stored in a secure portion of the device that generates the biometric public key K.

One may appreciate that the formula for K is linear. Therefore, in accordance with known properties of such formulas, it may be solved for a candidate value for the secret S, so long as K, A, and B are known. In particular, the solution is given by $S=A^{-1}(K-B)$, where if the binary matrix A is not square, a generalized matrix inverse (such as the Moore-Penrose pseudoinverse) may be used for the matrix multiplication. However, despite this linearity, the use of the secret S operates to mask the confident subset of biometric values B from detection, encrypting the value of B. In a pleasing symmetry, the use of the confident subset B operates to encrypt the value of S. In this way, the value of K verifiably characterizes both the biometric data of the individual and the secret number, without the need for non-transient storage of either the biometric data or the secret number.

It should be appreciated that the calculation may include information other than just the secret number S and the confident subset of biometric values B. Other information traditionally used for authentication purposes may be included as well, such as a name, driver license number, street address, organization membership number, and so on. This additional information may be easily incorporated in the linear method by first converting it to a compatible binary form, then (bitwise) adding it into the biometric public key K directly, or (bitwise) adding it to the secret number S before multiplication with the binary matrix A. It will also be appreciated that, if such additional information is used in calculating the biometric public key K, it must also be presented during authentication; in this case, the formula to solve for the secret number S must be modified accordingly.

The method of FIG. 5 concludes with a process 56, in which the computing facility stores the biometric public key in a storage facility. The storage facility may be a memory outside the computing facility, such as the non-authentication memory of an enrollment system 34. The enrollment system 34 may then perform optional operations using this biometric public key that are not strictly related to key generation, such as displaying a message on a display screen. Alternately, the storage facility may be a memory within the computing facility itself, if the device housing the computing facility is intended to be used only by the individual or a small group of authorized individuals. In another embodiment, the storage facility is a cryptographic token or a dongle provided by the individual, which stores the biometric public key for later authentication use by the individual.

An embodiment of the invention also may store, in the storage facility, other information in association with the biometric public key itself, the combination of all such related data forming a record that can be certified by a biometric certificate authority using cryptographic techniques known in the art. For example, a timestamp associated with the collection of the biometric can be stored in the record, along with a timestamp associated with the computation of the biometric public key. These additional data optionally may be used during the authentication process described below in connection with FIG. 6, either separately or in combination, to provide additional assurance that the authentication process is valid. Such data are particularly useful when converting an existing database of raw biometric data to a database in accordance with an embodiment of the invention, since either or both of the timestamps may act as a proxy for the validity of the underlying biometric data.

Figure 6:
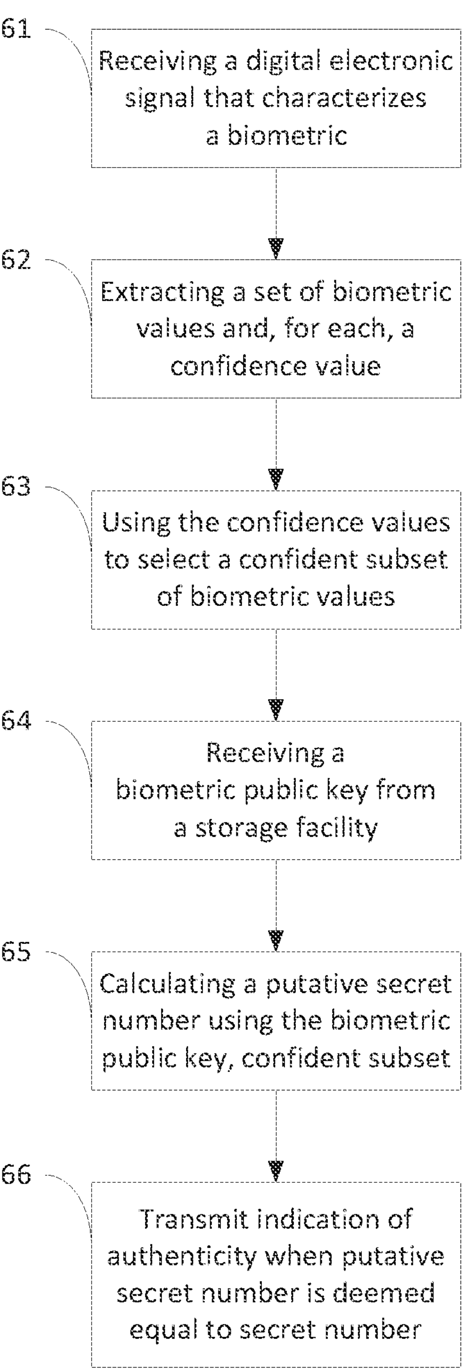
FIG. 6 is a flowchart illustrating a method of using biometric data to authenticate a subject as an individual whose biometric data has been previously obtained using a first transducer, without the need for non-transient storage of the biometric data, in accordance with the authentication process of FIG. 4.

FIG. 6 is a flowchart illustrating a method of using biometric data to authenticate a subject as an individual whose biometric data has been previously obtained using a first transducer, without the need for non-transient storage of the biometric data. The processes of FIG. 6 are contemplated to be carried out by a computing facility in an authentication system, such as the authentication system 44 shown in FIG. 4. The processes 61-63 of receiving a digital electronic signal that characterizes a biometric of a subject 41 purporting to be an individual 31, extracting biometric values and corresponding confidence values, and using the confidence values to select a confident subset of biometric values, are the same as processes 51-53 of FIG. 5, described above in detail.

The authentication processes of FIG. 6 diverge from the enrollment processes of FIG. 5 in process 64, in which the computing facility receives a biometric public key from a storage facility as described above in connection with FIG. 5. That is, the computing facility of the authentication system receives the product of the processes of FIG. 5. The storage facility may be, for example, a database controlled by a biometric certificate authority, or a dongle or cryptographic token, or a local memory, such as a non-transitory data store within the computing facility itself. In process 65, the computing facility calculates a candidate value for the secret number using the biometric public key and the confident subset. If the linear algebra method described in connection with process 55 is used to compute the biometric public key, the process 65 may be carried out in accordance with the formulas given in that description.

The method of FIG. 6 concludes with a process 66, in which the computing facility transmits an indication that the subject is authenticated as the individual when the candidate value for the secret number is deemed equivalent to the secret number characterized by the biometric public key. As described above in connection with FIG. 1, to determine equivalence, the secret number S may be encrypted using a one-way function (say, F) and the hashed value F(S) is received with the biometric public key K in process 64. It should be appreciated that, because the function F is one-way only, the secret number S cannot be feasibly recovered from the hashed value F(S), so the latter value F(S) may be made public without compromising the secret number S. To authenticate the subject, the function F is applied to the candidate value for the secret number S' to determine whether there is a match; that is, whether F(S)=F(S'). If so, then using well-known properties of cryptographic hash functions, one may conclude with a high degree of confidence that S=S', so the computing facility in fact already possesses the secret number S.

In another embodiment, to determine if the candidate value for the secret number S is correct, the embodiment may use the candidate value to compute candidate biometric data of the individual. This embodiment then compares the candidate biometric data of the individual with the captured biometric data of the subject, and authenticates the subject only if these two data sets are close enough according to some metric (e.g. Hamming distance). This is equivalent to the putative secret number being deemed equivalent to the actual secret number S. In this embodiment, F(S) does not need to be computed or published, and therefore F does not need to be included as a part of the embodiment.

It is possible that a small number of bits in the confident subset are erroneous, even though they were deemed reliable by the earlier processes, so if authentication fails, additional processes are performed before notifying that the subject is not authenticated as the individual, to ensure that the failure is not due to a problem with a small number of biometric values. In one embodiment, the confident subset includes 100 bits, and these additional processes may include brute force methods such as flipping the first bit out of 100, re-computing the key, and again determining if the subject is the individual. The process is repeated 100 times using a linear search to check for 1-bit errors in the confident subset. In another embodiment, two-bit errors are checked for by examining all possible combinations of 2-bit errors, re-computing the key each time and checking if the subject is the individual. In some embodiments, these computations may be performed in parallel in specialized hardware.

As discussed above in connection with FIG. 5, it should be appreciated that not everyone using an embodiment in accordance with the invention must authenticate using the same assurance data, or using only biometric data. A single device embodiment may include an iris scanner, fingerprint scanner, keyboard for entering a password, receptacle for a cryptographic token, and other such input mechanisms. Software or firmware for performing the method of FIG. 6 may prompt the subject to use any or all of these input mechanisms to provide the required assurance data. For example, if a biometric public key was created using both an iris scan and a fingerprint, then an authentication device that performs the method of FIG. 6 must incorporate both iris and fingerprint scanners.

Illustrated embodiments of the invention provide an "enroll-once authenticate-anywhere" system. An individual is required to enroll only one time, and is then able to authenticate on any authentication system in accordance with the embodiment. The individual need not have interacted with that authentication system before. The embodiment therefore provides an advantage over existing systems. If an individual owns multiple smartphones, or must replace her phone, she will be required to provision each phone. For example, she will be required to train each such device to recognize her fingerprint or iris. However, in accordance with this embodiment, no such repeated provisioning is required.

One embodiment of the invention therefore provides a "single sign-on" function. The biometric public key, by its nature, may be made entirely public, so it may be used by anyone desiring to authenticate subjects as individuals. Websites, banks, merchants, and others may use the same biometric public key. To the extent that no password was used to generate the biometric public key, no password will be required to authenticate a subject, and therefore no password maintenance procedures are required. In particular, because no password is required, it is impossible to forge the assurance data. The single sign-on embodiment can be implemented using a publicly accessible biometric certificate authority, or other such server, or by any of the other methods described above. One such embodiment includes a server for storing a hash of the secret number along with the biometric public keys. The hashes are indexed using identifying information (such as a name or address), then secured with an identification number and cryptographically signed. These records are then provided to anyone who wishes to authenticate a subject purporting to be an individual.

Thus, one embodiment of the invention provides a database of public keys that each characterize the biometric of an individual. Such public keys could be provided in a digitally signed certificate by a trusted third party, such as a certificate authority, using techniques known in the art. Then the identity of any person can be authenticated as follows. First, one obtains the public key of that person from the database. Next, one validates the public key using techniques known in the art. Then, one obtains the appropriate biometric from the person. Finally, one validates the obtained biometric against the public key using the authentication processes described above. According to this embodiment, any person can use his or her biometric data to be authenticated to anyone else, without publically exposing that biometric data, and in particular without registering that biometric data with the verifier.

Indeed, the above-described system and methods may be used to provide authentication for any purpose. In a number of uses, authentication of a subject as an individual is performed for the purpose of using information about the individual, such as, without limitation: temporarily identifying people receiving aide during or after a humanitarian crisis (e.g., to ensure equal distribution of aide), identifying people who file taxes, identifying people who receive health insurance, and so on. Thus, for example, embodiments of the invention may be used to replace social security numbers or driver licenses with biometric public keys.

In other uses, authentication of a subject as an individual is performed as a prerequisite to granting the subject any privilege accorded to the individual. Some such uses also require further assurances, such as presentation of a token or entry of a password, and include without limitation: border control applications, replacing hardware tokens such as common access cards (CAC), authenticating users to electronic devices such as smartphones, identifying employees for access to building premises and business data systems, authentication to a decentralized database (including peer-to-peer databases), and protecting digital messages (such as emails), among many others. Indeed, various embodiments of the invention may be used to entirely supplant the need for passwords or tokens.

Figure 7:
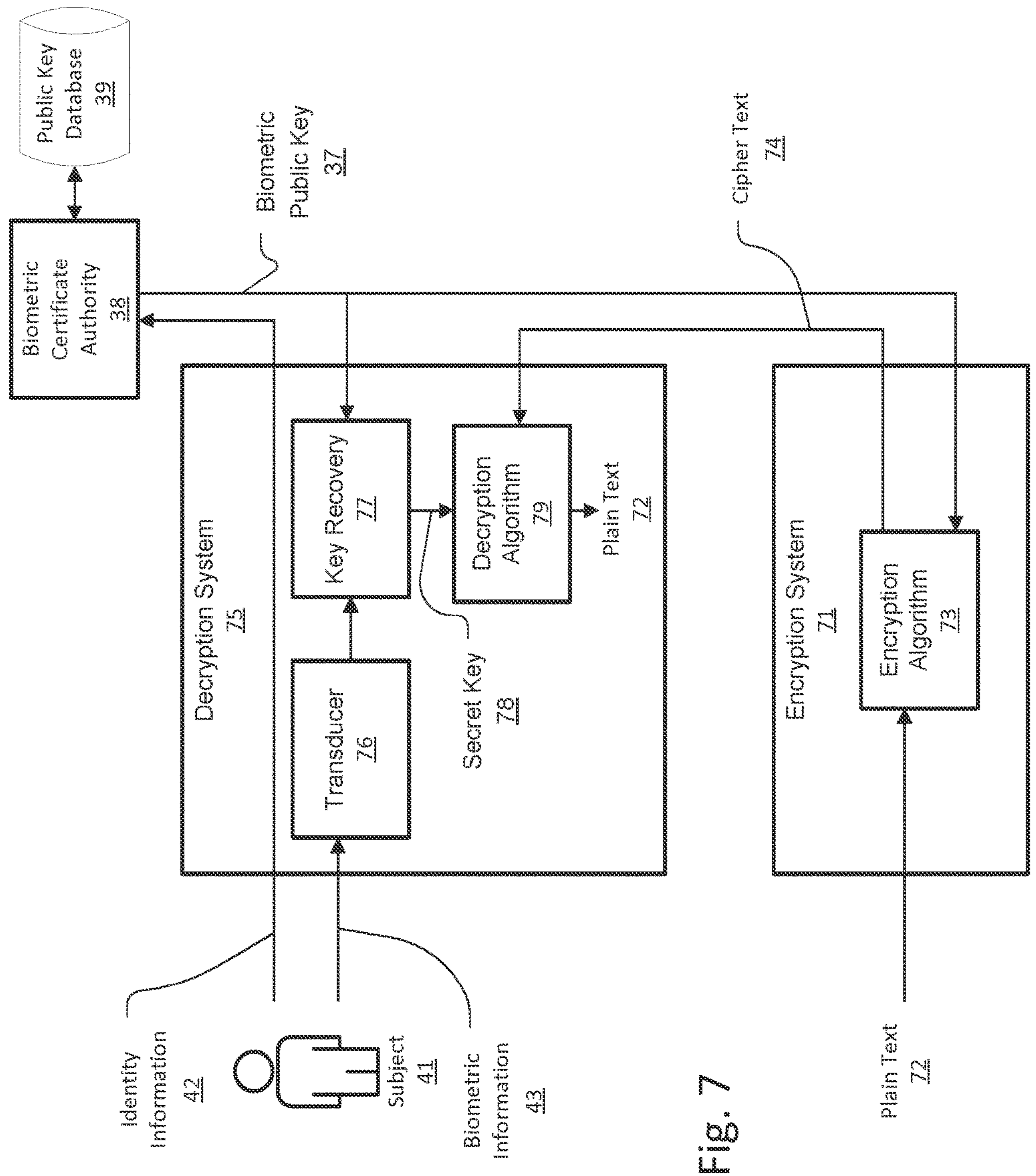
FIG. 7 is a schematic representation of data flow through functional components used in an embodiment of the invention to provide a unidirectional encrypted communications channel.
Figure 8:
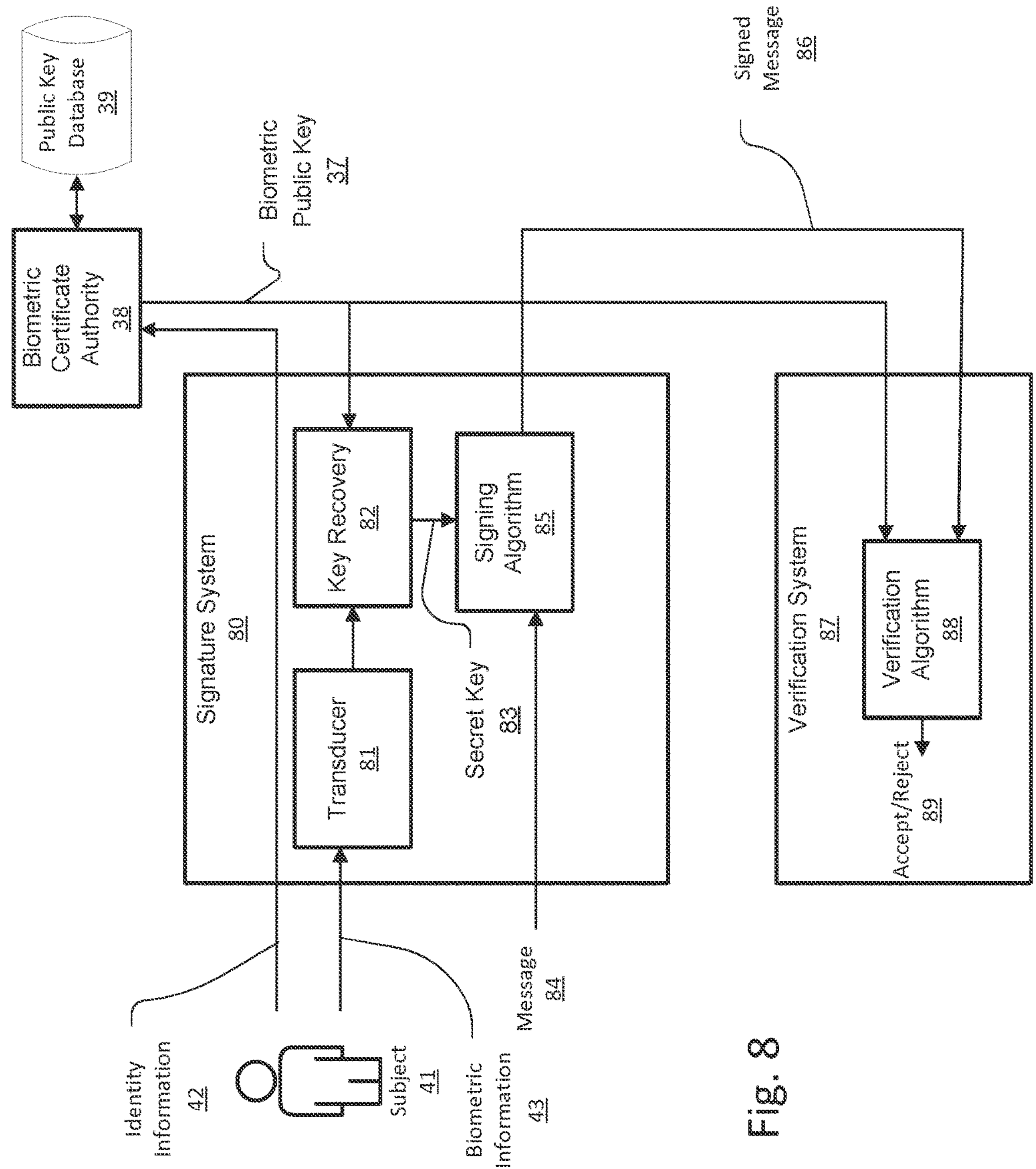
FIG. 8 is a schematic representation of data flow through functional components used in an embodiment of the invention to compute and verify a digital signature for a message.

Two particular uses are shown in FIGS. 7 and 8: secure communications, and message signing. These uses are well known and particularly common in the art of cryptographic systems, and are provided to illustrate the power and flexibility of various embodiments of the invention. The remaining figures illustrate various hardware implementations that provide cost savings over existing authentication mechanisms.

FIG. 7 is a schematic representation of data flow through functional components used in an embodiment of the invention to provide a communications channel to send encrypted messages to a subject 41. The communications channel shown in FIG. 7 is unidirectional; that is, it illustrates how messages may be sent from any person to the subject 41.

In accordance with the embodiment shown in FIG. 7, any person wishing to communicate securely with the subject 41 must have an encryption system 71. The encryption system 71 need only include a computing facility as known in the art; it need not include a transducer to authenticate the sender, unless bidirectional communication with the subject 41 is desired. Thus, the encryption system 71 may be an ordinary desktop computer, smartphone, or similar device as known in the art.

To establish the secure communications channel to the subject 41, an individual first configures the encryption system 71 to receive a record containing the necessary encryption information. For example, the record may characterize a public/private key pair for performing an asymmetric encryption algorithm as known in the art. The public key may be stored directly in the record, while the private key may be the secret number characterized by the biometric public key 37.

Obtaining the record may be done using methods known in the art of public key distribution and public key infrastructure, for example by the encryption system 71 providing sufficient identity information to the biometric certificate authority 38 to permit retrieval of the record from the public key database 39. The particular biometric certificate authority 38 that includes the correct record may itself be determined, for example, by consulting a directory that maps individuals to such authorities.

Then, to encrypt plain text 72, a computing facility of the encryption system 71 executes an encryption algorithm 73 to generate a cipher text 74 using the public key data from the record. The cipher text 74 may then be sent to the decryption system 75 using any insecure communications means, such as the Internet.

Decryption in accordance with this embodiment begins in much the same way as the authentication process shown in FIGS. 4 and 6. Indeed, authentication of a subject 41 as the intended individual, using the subject's identity information 42 and biometric information 43, must be performed as a prerequisite to accessing the decryption functions of the computing facility of the decryption system 75. For brevity, these authentication processes are not described here. It is sufficient to note that the decryption system 75 may be implemented as a device as shown in FIG. 2 and described in connection therewith. In particular, it includes a transducer 76 and a computing facility that performs at least two functions: a key recovery function 77 that recovers the secret number 78 (identical to the key recovery function 46 described in connection with FIG. 4), and a decryption algorithm 79 that uses the recovered secret number 78 to reproduce the plain text 72 from received cipher text 74.

After performing the authentication processes described in connection with FIGS. 4 and 6, the decryption system 75 passes the recovered secret number 78 to a decryption algorithm 78, which uses the number as the private key corresponding to the public key used by the encryption algorithm 73. If the subject 41 is not authorized to decrypt the cipher text 74, the decryption algorithm 79 will necessarily fail because the secret number 78 will be incorrectly recovered by the key recovery function 77, and the plain text 72 will not be produced.

It should be appreciated that the data flows depicted in FIG. 6 establish a unidirectional communications channel. To provide bidirectional communications, the process depicted in FIG. 6 may be performed between two or more individuals for mutual authentication (once per individual), simply by reversing the roles of the sender and receiver. Such mutual authentication may be performed prior to transmission of meaningful data. Moreover, if the communications will be extensive, a symmetric encryption algorithm 73 is preferred for computational efficiency. Such algorithms require the establishment of a shared secret, which may be done using a key agreement protocol known in the art such as the Diffie-Hellman protocol or the Kerberos protocol.

Another embodiment of the invention may be used to establish a secure data communications channel between two parties. A first, provisioning phase, is essentially the same as described above in connection with FIGS. 3 and 5, except that instead of storing the biometric public key and hash of the secret number in a public repository, this information is given by the individual 31 to the other person in a manner in which the individual's identity is unquestionable (for example, by the individual 31 physically handing the other person a cryptographic token containing the information). In a second, communication phase, the sender sends only the biometric public key to a subject 41 purporting to be the individual 31. The subject 31 uses a picture of their eye and the biometric public key to reconstruct the hash of the secret number, using the processes described above. If these processes are successful, then the hash function of the secret number becomes a shared secret that may be used, for example, as a "session key" (as that phrase is known in the art). However, the authentication processes can only be successful if the subject 41 possesses the biometrics of the individual 31. In this way, this embodiment enables the creation of a secure session for communication.

FIG. 8 is a schematic representation of data flow through functional components used in an embodiment of the invention to compute and verify a digital signature for a message. As with the decryption processes shown in FIG. 7, signing a message begins with a subject 41 providing identity information 42 and biometric information 43 to a device, in this case a signature system 80 that includes a transducer 81 and a computing facility that provides a key recovery function 82 that recovers the secret number 83 of the individual. Such a signature system 80 may be a device as shown in FIG. 2 and described above.

However, in accordance with this use case, the subject 41 provides the signature system 80 with a message 84 to be signed. The computing facility of the signature system 80 performs a signing algorithm 85 on the message to produce a signed message 86 that purports to be from the individual, using the secret key 83 recovered by the key recovery function 82. Such signing algorithms are well known in the art. For example, a message may be signed by applying a keyed-hash message authentication code (HMAC) as known in the art, using the secret key 83 as the key.

A verification system 87 may be used to verify the signed message 86, using methods known in the art. Thus, when the verification system 87 receives a signed message 86, it obtains a record containing the public key of the individual from the biometric certificate authority 38, using the methods described above in connection with FIG. 7. Then the verification system executes a verification algorithm 88, using the signed message 86 and the retrieved public key. Such verification algorithms form part of the overall message signing protocol, and are also well known in the art. If the verification was successful, the verification system 87 produces an "accept" indication, while if the verification was unsuccessful, the verification system 87 produces a "reject" indication.

In one embodiment of the invention, the verification system 87 also stores public keys that are signed by the biometric certificate authority 38, using standard PKI processes. In another embodiment, the signed message 86 includes a timestamp, and the verification system 87 only accepts signatures with a valid timestamp. In this way, a signed message 86 may be caused to expire after a fixed duration.

Figure 9:
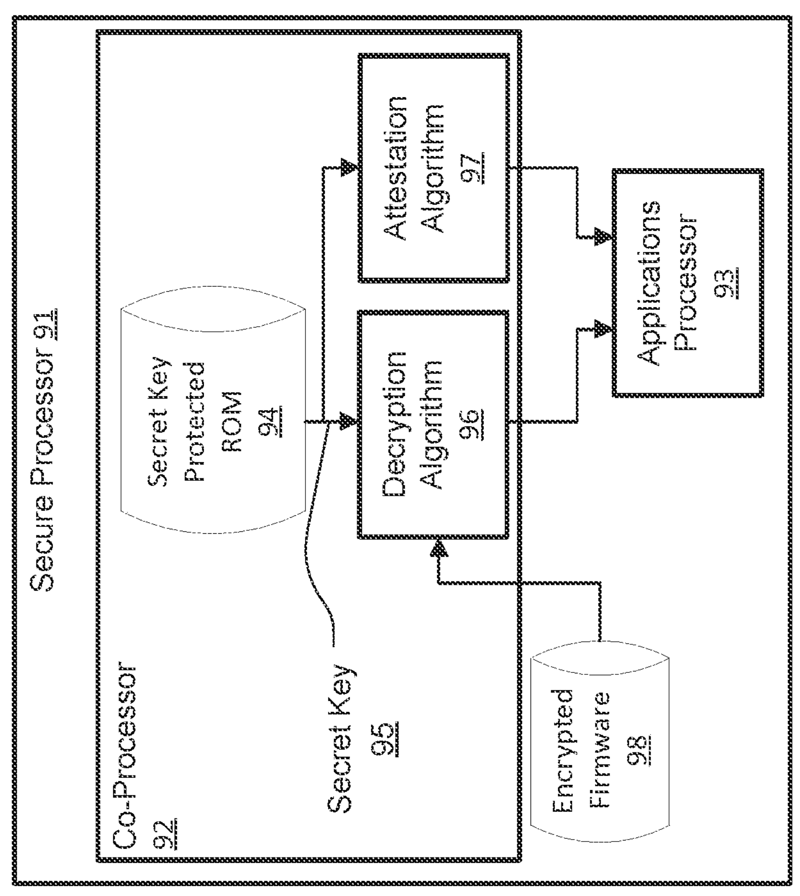
FIG. 9 is a schematic representation of data flow through functional components used in a prior art secure processor.

FIG. 9 is a schematic representation of data flow through functional components used when booting a prior art secure processor. The secure processor 91 includes a co-processor 92 and an applications processor 93 in communication. To ensure that only approved applications are run on the applications processor 93, the software used to boot the system is encrypted. Due to its encryption, the boot software may be stored as encrypted firmware 98 outside the security boundary of the co-processor 92. This allows the encrypted firmware 98 to be updated without tampering with the internals of the co-processor 92.

The boot process operates as follows. When the secure processor 91 turns on, the co-processor 92 loads the secret key 95 from a protected read-only memory (ROM) 94 into a decryption algorithm 96 and an attestation algorithm 97. It then loads the encrypted firmware 98, decrypts the firmware using the decryption algorithm 96, and sends the decrypted firmware to be run by the applications processor 93. In one embodiment, the attestation algorithm 97 is optionally used by the applications processor 93 to prove to an external party that the loaded firmware image is correct. The attestation algorithm 97 may not be included if that functionality is not required by the applications processor 93.

The security of the boot process depends directly on maintaining the security of the secret key 95. In certain high-security applications, for example in military use, it is entirely conceivable, even likely, that a captured secure processor will be disassembled and any secret key 95 compromised. Therefore, in these situations the security of the co-processor 92 ultimately depends on the security of its hardware; that is, it possesses a hardware root of trust. For this reason, the co-processor 92 often is hardened against physical and electrical tampering, which increases its cost significantly. In particular, the co-processor 92 must prevent access to the ROM 94 that contains the secret key 95, and must prevent access to the key itself when in transit between the ROM 94 and the various functional modules within the security boundary of the co-processor 92.

Figure 10:
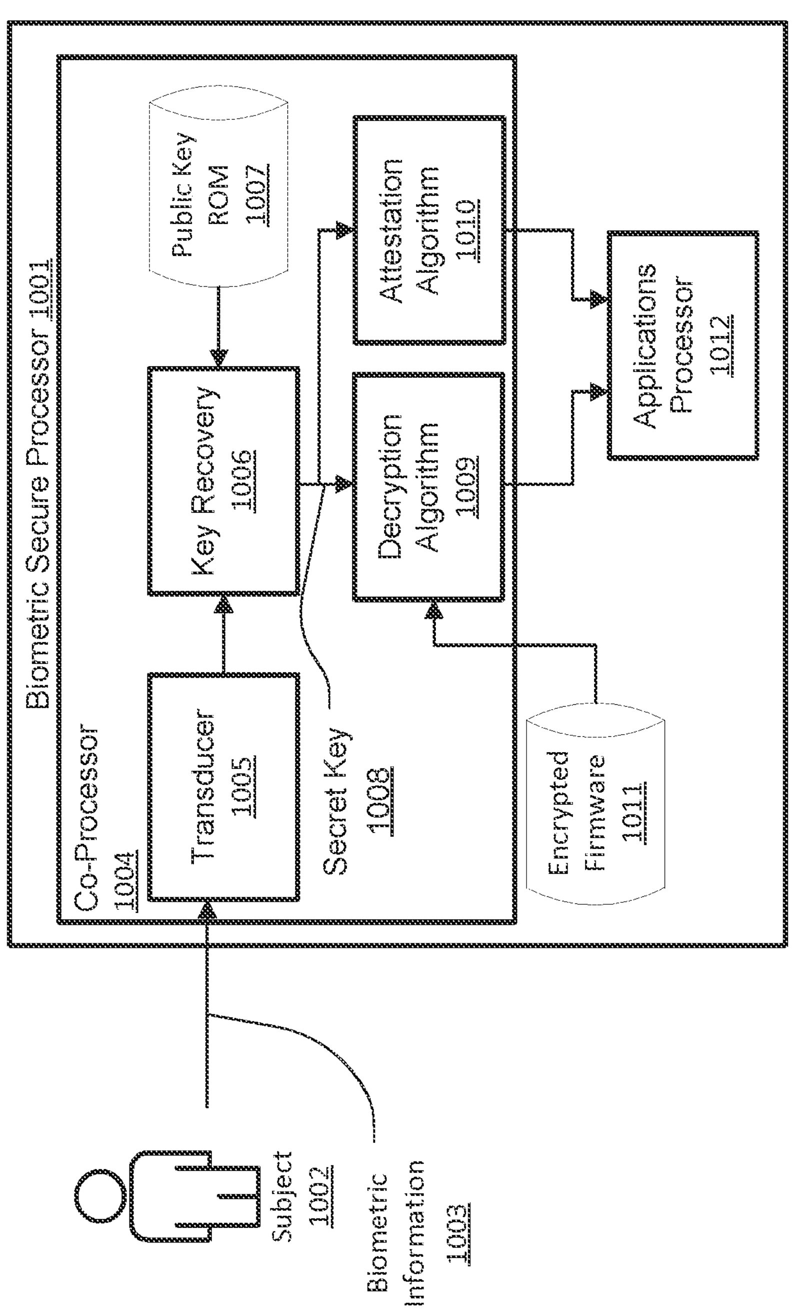
FIG. 10 is a schematic representation of data flow through functional components used in an improved, biometric secure processor.

FIG. 10 is a schematic representation of data flow through functional components used in an improved, biometric secure processor. Advantageously, the embodiment of FIG. 10 enables a system that eliminates the need for a hardware root of trust, yet provides improved security. Eliminating the hardware root of trust is a significant cost saver. Hardware roots of trust take many forms and can be found in many systems, some of which include trusted platform modules, smart cards, chips, ARM TrustZone, Intel SGX, hotel keys, self-encrypting drives, key fobs, USB tokens, Aladdin eToken, and e-Passports.

The boot process of the biometric secure processor 1001 operates as follows. A subject 1002, provides his or her biometric information 1003 to the biometric secure processor 1001, and in particular to a co-processor 1004. This biometric information 1003 is captured by a transducer 1005 in the co-processor 1004, in the same manner as described above in connection with FIGS. 4 and 6. The transducer 1005 processes the biometric information 1003 and sends these data to the key recovery process 1006. The key recovery process 1006 receives a biometric public key from a ROM 1007, and recovers the secret key 1008 as described above. In the embodiment of FIG. 10, the subject 1002 does not need to provide any identity information, as the ROM 1007 includes only a single biometric public key. However, in an alternate embodiment, the ROM 1007 may contain more than one biometric public key, so that more than one subject 1002 may use the biometric secure processor 1001.

Once the key recovery function 1006 has completed, the secret key 1008 is sent to the decryption algorithm 1009 and the attestation algorithm 1010, which perform the same function as their counterparts in the prior art processor of FIG. 9. The decryption algorithm 1009 receives the encrypted firmware 1011, decrypts it, and sends the unencrypted firmware to be run by the applications processor 1012. The applications processor 1012 may optionally use the attestation algorithm 1010 to attest to the integrity of its firmware at a later time.

The embodiment of FIG. 10 has wide-ranging applications, especially in military use and supervisory control and data acquisition (SCADA) control systems that require start-up procedures. For example, tank computing facilities require expensive active anti-tamper systems and a hardware root of trust. Thus, one possible application is to prevent a tank from starting up unless an authorized individual presents a biometric. Authorized military personnel may complete the enrollment process to produce a biometric public key, as shown in FIGS. 3 and 5. The biometric public key may then be installed in a computing facility in the tank, and in particular as a ROM 1007 of a biometric secure processor 1001. The tank requires software to start up, which may be stored as encrypted firmware 1011. Thus, the tank does not turn on unless the would-be driver is authenticated using the authentication process as shown in FIGS. 4 and 6. No secure storage is required on the tank for the biometric authentication processes, thereby reducing the cost to manufacture the tank.

Figure 11:
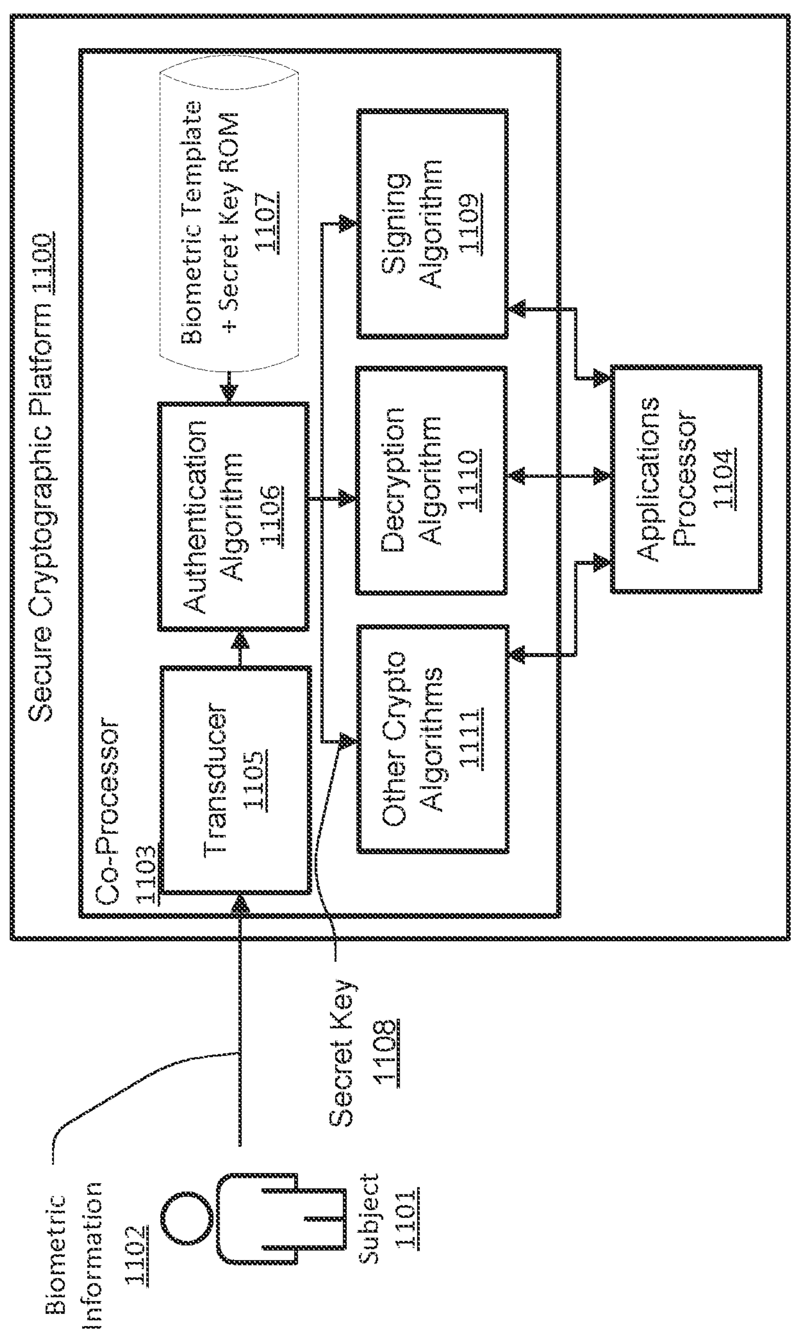
FIG. 11 is a schematic representation of data flow through functional components used in a prior art secure computing platform.

FIG. 11 is a schematic representation of data flow through functional components used in a prior art secure cryptographic platform 1100. The subject 1101 presents his or her biometric information 1102 to a transducer 1105 in a co-processor 1103. The transducer 1105 processes the biometric information 1102 and sends these data to an authentication algorithm 1106. The authentication algorithm 1106 obtains a copy of an authorized individual's biometric data from the ROM 1107. If the biometric information 1102 matches (to within an acceptable level) the individual's biometric data obtained from the ROM 1107, the authentication algorithm 1106 obtains the secret key stored in the ROM 1107. Other algorithms (e.g., the signing algorithm 1109, the decryption algorithm 1110, and other crypto algorithms 1111) may then access the secret key 1108. The applications processor 1104 may communicate with the co-processor 1103 to invoke the cryptographic algorithms 1109, 1110, 1111. Note that the construction in FIG. 11 requires securing the ROM 1107 to permit securely and secretly storing both the biometric template information and the secret key.

Figure 12:
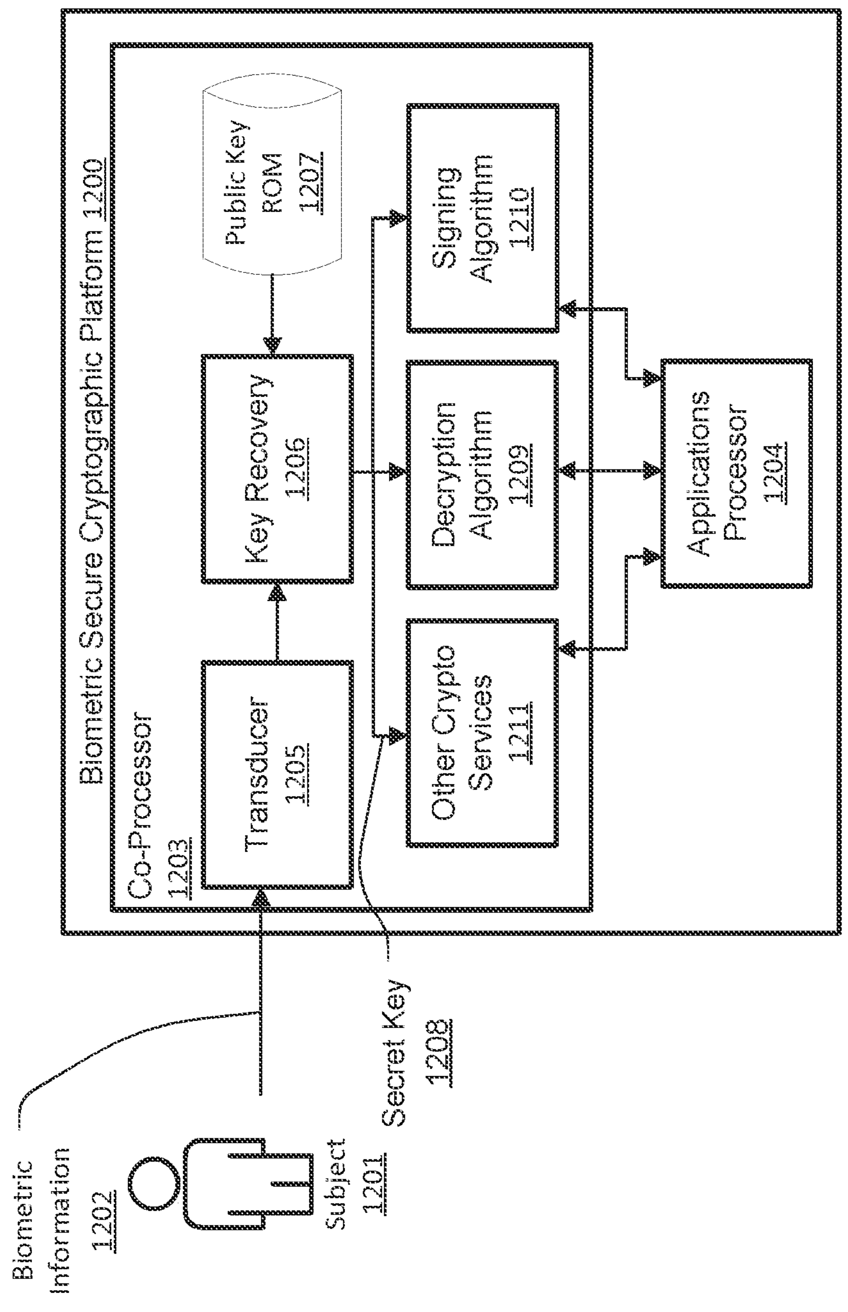
FIG. 12 is a schematic representation of data flow through functional components used in an improved, biometric secure platform.

FIG. 12 is a schematic representation of data flow through functional components used in an improved, biometric secure cryptographic platform 1200. The subject 1201 presents his or her biometric information 1202 to a transducer 1205 inside of a co-processor 1204. The transducer 1205 processes the biometric information 1202 and sends these data to a key recovery process 1206. The key recovery process 1206 obtains a biometric public key from the public key ROM 1207, and recovers the secret key 1208 as described above. Cryptographic algorithms such as the decryption algorithm 1209, signing algorithm 1210, and other cryptographic algorithms 1211 may then use the secret key 1208. The applications processor 1204 may then communicate with the co-processor 1203 to invoke the cryptographic algorithms 1209, 1210, 1211.

Note that if the subject 1201 is not authenticated during the key recovery process 1206, the secret key 1208 is not generated, so none of the cryptographic algorithms 1209, 1210, 1211 are available to the applications processor 1212. Also note that the biometric secure cryptographic platform 1200 does not require the use of any secure ROM, unlike the prior art platform of FIG. 11. By contrast, the public key ROM 1207 may be accessed by anyone, without loss of security functionality.

Embodiments of the present invention realize several advantages over the prior art. Noise is often introduced due to temperature variations, a person not scanning his or her finger or eye exactly the same way each time, and other such errors. Experimental data suggest that the methods described herein result in a higher error correction rate than any other known method in the biometric mask art (by more than a factor of three in certain applications). Essentially, this means that the invention makes it possible for the biometric scan to have a lot of noise and still be cryptographically secure, a major differentiator over prior art.

One downside that is often cited for biometrics is that if an individual's iris scan or fingerprint is compromised, it can't be "reset" like a password can be reset. But with the processes described herein, multiple keys can be derived from the same biometric, so if F(S) is compromised, one can compute a new F'(S) for the same person's biometric. Embodiments of the invention are unique in being able to overcome this downside. Also, F(S) is a stable key that can be integrated into any other cryptographic protocol. Therefore, embodiments of the invention trivially extend to multi-factor authentication by use of F(S) in combination with other passwords and tokens.

One primary challenge with existing PKI is how to cryptographically tie a public key to a user. The methods disclosed herein solve that problem. For example, the U.S. military has stated that there is a vulnerability in their current systems because they are not able to attribute actions to a particular person, which affects forensics and legal prosecutions. One does not know whether a particular user performed a malicious action, or whether someone stole his or her token, password, or certificate and pretended to be the user. With the techniques disclosed herein, one can ensure that the user was physically present and performing the action by scanning the user's biometric at that time. The user cannot give their biometric to someone else (without ripping out their eye, for example), and no one can steal someone else's biometric. Therefore, embodiments of the invention can cut down on costs associated with data forensics and steps taken after a breach has occurred.

As a final example of an advantageous application of the concepts disclosed herein, note that a biometric may be a measurement of organic characteristics of a group of individuals. Thus, in another embodiment of the invention, the biometric used to produce the public key may consist of measurements of a group of people, so that successful authentication can occur only when all people are present for their organic characteristics to be measured. This embodiment is useful when one must prove that all parties are present in one or more locations at the same time. This embodiment therefore may be seen as a new threshold cryptosystem that uses biometric data rather than, or in addition to, other data (such as points on a secret curve to be reconstructed, as is known in the art).

The embodiments of the invention described above are intended to be merely exemplary; numerous variations and modifications will be apparent to those skilled in the art. All such variations and modifications are intended to be within the scope of the present invention as defined in any appended claims.

Various embodiments of the invention may be implemented at least in part in any conventional computer programming language. For example, some embodiments may be implemented in a procedural programming language (e.g., "C"), or in an object oriented programming language (e.g., "Java"). Other embodiments of the invention may be implemented as a pre-configured, stand-alone hardware element and/or as preprogrammed hardware elements (e.g., application specific integrated circuits, FPGAs, and digital signal processors), or other related components.

In an alternative embodiment, the disclosed apparatus and methods (e.g., see the various flow charts described above) may be implemented as a computer program product for use with a computer system. Such implementation may include a series of computer instructions fixed in a non-transitory manner on a medium, such as a computer readable medium (e.g., a diskette, CD-ROM, ROM, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). In fact, some embodiments may be implemented in a software-as-a-service model ("SAAS") or cloud computing model. Of course, some embodiments of the invention may be implemented as a combination of both software (e.g., a computer program product) and hardware. Still other embodiments of the invention may be implemented as entirely hardware, or entirely software.

What is claimed is:

1. A non-transitory computer readable storage medium encoded with instructions that, when executed by a computing facility, establish computer processes for generating a biometric public key for an individual based on biometric data of the individual, without the need for non-transient storage of the biometric data, the computer processes comprising:

receiving by a computing facility, from a transducer, a digital electronic signal that characterizes a biometric of the individual;

extracting by the computing facility, from the digital electronic signal, (a) a set of biometric values of the individual and (b), for each member of the set of biometric values of the individual, a confidence value indicating a degree of confidence that the corresponding biometric value is stable between characterizations;

using the confidence values to select, by the computing facility, only some, but not all, of the biometric values in the set extracted from the digital electronic signal, the selected biometric values being a confident subset of the set of biometric values of the individual, the confident subset excluding biometric values deemed to be unreliable as a discriminant of an identity of the individual based on the biometric;

generating, by the computing facility, a secret number;

computing, by the computing facility, the biometric public key based on the secret number and the confident subset, wherein the biometric public key verifiably characterizes both the biometric data of the individual and the secret number without the need for non-transient storage of either the confident subset or the secret number; and storing the biometric public key in a storage facility.

2. A non-transitory computer-readable medium according to claim 1, wherein the storage facility for storing the biometric public key is a facility selected from the group consisting of a public data source, a non-transitory data store, and a cryptographic token.

3. A non-transitory computer-readable medium according to claim 1, wherein the computer processes further comprise:

associating, by the computing facility, the biometric public key with a one-way function of the secret number; and storing the one-way function of the secret number in the storage facility.

4. A non-transitory computer-readable medium according to claim 3, wherein the one-way function is a cryptographic hash function.

5. A non-transitory computer-readable medium according to claim 1, wherein generating the secret number includes computing and storing a hash of the secret number in the storage facility.

6. A non-transitory computer-readable medium according to claim 1, wherein the confident subset is a vector having N rows and 1 column of bits.

7. A non-transitory computer-readable medium according to claim 6, wherein the secret number is a vector having M rows and 1 column of bits.

8. A non-transitory computer-readable medium according to claim 1, wherein the computer processes further comprise ensuring integrity of the transducer.

9. A computer-implemented method of generating a biometric public key for an individual based on biometric data of the individual, without the need for non-transient storage of the biometric data, the method comprising:

receiving by a computing facility, from a transducer, a digital electronic signal that characterizes a biometric of the individual;

extracting by the computing facility, from the digital electronic signal, (a) a set of biometric values of the individual and (b), for each member of the set of biometric values of the individual, a confidence value indicating a degree of confidence that the corresponding biometric value is stable between characterizations;

using the confidence values to select, by the computing facility, only some, but not all, of the biometric values in the set extracted from the digital electronic signal, the selected biometric values being a confident subset of the set of biometric values of the individual, the confident subset excluding biometric values deemed to be unreliable as a discriminant of an identity of the individual based on the biometric;

generating, by the computing facility, a secret number;

computing, by the computing facility, the biometric public key based on the secret number and the confident subset, wherein the biometric public key verifiably characterizes both the biometric data of the individual and the secret number without the need for non-transient storage of either the confident subset or the secret number; and storing the biometric public key in a storage facility.

10. A method according to claim 9, wherein the storage facility for storing the biometric public key is a facility selected from the group consisting of a public data source, a non-transitory data store, and a cryptographic token.

11. A method according to claim 9, further comprising:

associating, by the computing facility, the biometric public key with a one-way function of the secret number; and storing the one-way function of the secret number in the storage facility.

12. A method according to claim 11, wherein the one-way function is a cryptographic hash function.

13. A method according to claim 9, wherein generating the secret number includes computing and storing a hash of the secret number in the storage facility.

14. A method according to claim 9, wherein the confident subset is a vector having N rows and 1 column of bits.

15. A method according to claim 14, wherein the secret number is a vector having M rows and 1 column of bits.

16. A method according to claim 9, further comprising ensuring integrity of the transducer.

17. A non-transitory computer readable storage medium encoded with instructions that, when executed by a computing facility, establish computer processes for using biometric data to authenticate a subject as an individual whose biometric data has been previously obtained using a first transducer, without the need for non-transient storage of the biometric data, the computer processes comprising:

receiving by a computing facility, from a second transducer coupled to the computing facility, a digital electronic signal that characterizes a biometric of the subject;

extracting by the computing facility, from the digital electronic signal, (a) a set of biometric values of the subject and (b), for each member of the set of biometric values of the subject, a confidence value indicating a degree of confidence that the corresponding biometric value is stable between characterizations;

using the confidence values to select, by the computing facility, only some, but not all, of the biometric values in the set extracted from the digital electronic signal, the selected biometric values being a confident subset of the set of biometric values of the subject, the confident subset excluding biometric values deemed to be unreliable as a discriminant of an identity of the subject based on the biometric;

receiving by the computing facility, from a storage facility, a biometric public key that was computed based on a secret number and the biometric data of the individual that has been previously obtained using the first transducer, wherein the biometric public key verifiably characterizes both the biometric data of the individual and the secret number without the need for non-transient storage of either the biometric data of the individual or the secret number;

computing, by the computing facility, a candidate value for the secret number using the biometric public key and the confident subset;

performing an authentication process by determining whether the candidate value for the secret number is deemed equivalent to the secret number characterized by the biometric public key; and authenticating the subject as the individual when the candidate value for the secret number is deemed equivalent to the secret number.

18. The non-transitory computer-readable medium according to claim 17, wherein the computer processes further comprise receiving, by the computing facility from the storage facility, a one-way function of the secret number, wherein authenticating the subject as the individual includes applying the one-way function to the candidate value for the secret number and comparing the result to the received one-way function of the secret number.

19. The non-transitory computer-readable medium according to claim 18, wherein the one-way function is a cryptographic hash function.

20. The non-transitory computer-readable medium according to claim 17, wherein the biometric public key includes data comprising a bitwise exclusive OR of (a) a vector of biometric values of the individual, with (b) a matrix product of a matrix with a representation of the secret number as a vector of bits.

21. The non-transitory computer-readable medium according to claim 20, wherein the matrix is associated uniquely with the individual, or is associated uniquely with the computing facility, or is permanently fixed as a design parameter wherein the same matrix can be used to authenticate multiple subjects.

22. The non-transitory computer-readable medium according to claim 17, wherein the computer processes further comprise, using, by the computing facility, biometric data pertaining to a different measurable characteristic to authenticate a second subject as a second individual whose biometric data has been previously obtained.

23. The non-transitory computer-readable medium according to claim 17, wherein the computer processes further comprise decrypting, by the computing facility using the candidate value for the secret number, encrypted cipher text received by a computing device in which the computing facility is disposed.

24. The non-transitory computer-readable medium according to claim 17, wherein the computer processes further comprise digitally signing a message, by the computing facility, using the candidate value for the secret number.

25. The non-transitory computer-readable medium according to claim 17, wherein the computer processes further comprise:

receiving encrypted firmware for booting a computing device in which the computing facility is disposed, by the computing facility, from a memory of the computing device;

decrypting, by the computing facility using the candidate value for the secret number, the encrypted firmware to produce decrypted firmware; and providing the decrypted firmware by the computing facility to a computing processor of the computing device.

26. The non-transitory computer-readable medium according to claim 17, wherein the computer processes further comprise executing a cryptographic algorithm that operates on the secret number, by the computing facility, responsive to a request message from an application executing on a computing processor of a computing device in which the computing facility is disposed.

* * * * *